United States Patent [19]
Corella et al.

[11] Patent Number: 5,835,683
[45] Date of Patent: Nov. 10, 1998

[54] SYSTEM AND METHOD FOR AUTHORING AN EXPERT SYSTEM

[75] Inventors: Francisco Corella, Chappaqua; Michelle Yoonkyung Kim, Scarsdale, both of N.Y.

[73] Assignee: International Business Machines Corporation, Armonk, N.Y.

[21] Appl. No.: 371,903

[22] Filed: Jan. 12, 1995

[51] Int. Cl.$^6$ .................................................. G06F 17/00
[52] U.S. Cl. ................................. 395/75; 395/12; 395/50; 395/77; 395/764
[58] Field of Search ................................. 395/75, 76, 77, 395/50, 22, 10, 12, 148, 155, 161, 60

[56] References Cited

U.S. PATENT DOCUMENTS

| | | |
|---|---|---|
| 4,837,689 | 6/1989 | Tanaka . |
| 4,891,766 | 1/1990 | Derr . |
| 4,931,950 | 6/1990 | Isle . |
| 5,195,172 | 3/1993 | Elad . |
| 5,257,185 | 10/1993 | Farley . |
| 5,261,037 | 11/1993 | Tse . |
| 5,263,126 | 11/1993 | Chang . |
| 5,276,607 | 1/1994 | Harris et al. ............................. 364/401 |
| 5,295,230 | 3/1994 | Kung . |
| 5,319,740 | 6/1994 | Yamada . |
| 5,333,237 | 7/1994 | Stefanopoulos . |
| 5,367,619 | 11/1994 | Dipaolo . |
| 5,412,758 | 5/1995 | SriKanth . |
| 5,481,647 | 1/1996 | Brody . |
| 5,504,851 | 4/1996 | Maesano . |
| 5,506,937 | 4/1996 | Ford . |
| 5,517,405 | 5/1996 | McAndrew . |

OTHER PUBLICATIONS

Clay Carr, "Spreadsheet sketches for rule based systems," AI Expert Nov. 1998.

Mans Mann III An Expert System using scripatable spread sheet Carr spreadsheet sketches for rule based system.

1–2–3 The Complete Reference, Osborne McGraw–Hill, 1986, p.245.

Buchanan, Bruce G., Shortliffe, Edward H., Rule–Based Expert Systems The MYCIN Experiments of the Stanford Heuristic Programming Project, pp. vi–v—, pp. 67–132, pp. 302–313.

*Primary Examiner*—Robert W. Downs
*Assistant Examiner*—Jeffrey S. Smith
*Attorney, Agent, or Firm*—Ronald L. Drumheller; Louis J. Percello

[57] ABSTRACT

An authoring system and method create a knowledge base for an expert system that comprises communication cells for storing external data, assertion cells for storing data acquired from a user in the course of a user dialog, and interaction cells that specify (multimedia) interactions with the user, which are carried out as the cells are invoked by the run-time program. Each interaction cell has an enabling condition that must be satisfied before it can be invoked. At authoring time, the knowledge base is constructed by an expert system author who allocates the knowledge base cells on a rectangular grid similar to a spreadsheet. The author can try out various what-if scenarios by setting the values of assertion and communication cells and recalculating the knowledge base or simulating the created expert system. The grid is only an authoring tool, which is not visible or present at run time. A preferred application of the system is to create a health care expert system that will exchange information with a health care provider.

14 Claims, 31 Drawing Sheets

FIG. 5

|   | 1 | 2 | 3 | 4 | 5 | 6 | 7 | 8 | 9 | 10 |
|---|---|---|---|---|---|---|---|---|---|----|
| A | ANC | | LOW_ANC | | NORM_ANC | | | | | |
| B | 950 | | TRUE | | - | | | | | |
| C | | | | | | | | | | |
| D | TEMP | | LOW_TEMP | | NORM_TEMP | | HIGH_TEMP | | VH_TEMP | |
| E | 100.5 | | - | | - | | TRUE | | NIL | |
| F | | | | | | | | | | |
| G | CALL_DR | | | INFECTION | | | | | | |
| H | TRUE | | | TRUE | | | | | | |
| I | | | | | | | | | | |
| J | MAIN_SYMPTOMS | | | COUGH | | PAIN | | VOMITING | | DIARRHEA |
| K | DONE | | | TRUE | | TRUE | | NIL | | NIL |
| L | | | | | | | | | | |
| M | COUGH_FREQ | | | COUGH_OCC | | COUGH_OFTEN | | COUGH_ALWAYS | | |
| N | DONE | | | NIL | | TRUE | | NIL | | |
| O | | | | | | | | | | |
| P | COUGH_TYPE | | | THROAT_CLRNG | | DEEP_COUGH | | TIGHT_COUGH | | |
| Q | DONE | | | NIL | | NIL | | TRUE | | |
| R | | | | | | | | | | |
| S | PAIN_LOCATION | | | HEAD_PAIN | | NECK_PAIN | | CHEST_PAIN | | ABDO_PAIN |
| T | DONE | | | NIL | | NIL | | TRUE | | NIL |
| U | | | | | | | | | | |

SYSTEM AND METHOD FOR AUTHORING AN EXPERT SYSTEM

FIELD OF THE INVENTION

This invention relates to the field of expert systems. More specifically, it relates to a system and a method for authoring an expert system.

BACKGROUND

An expert system is a computer program that comprises a knowledge base embodying expertise in a certain application domain and conducts a dialog with a computer user in order to obtain information from the user and, possibly, provide information to the user in return. The expertise embodied in the system allows the system to ask pertinent questions from the user during the dialog, and to provide information to the user based on the information obtained from the user in response to those questions.

The notion of expertise is to be understood in a broad sense: no degree of complexity is implied. The notion of information is also to be understood in a broad sense. In particular, the information provided to the user, if any, may comprise advice, instructions on how to perform a certain procedure, explanations, examples, or information of any other kind.

A difficulty with traditional expert systems is that building an expert system requires considerable expertise in programming or so-called knowledge engineering in addition to the expertise in the application domain that is to be embodied in the system. A programmer or knowledge engineer must obtain domain knowledge from a domain expert and encode that knowledge in the knowledge base, either as program code, usually written in an Artificial Intelligence programming language such as LISP or PROLOG, or as inference rules. This results in high development costs and creates the possibility of errors being introduced by miscommunication between the knowledge engineer and the domain expert. The present invention provides a solution to this drawback of traditional expert systems.

OBJECTS OF THE INVENTION

An object of this invention is an authoring system and associated authoring method for constructing an improved knowledge base for an expert system that conducts a dialog with a computer user.

SUMMARY OF THE INVENTION

This disclosure discloses a novel kind of knowledge base for an expert system that conducts a dialog with a computer user, an authoring system and associated authoring method for building such a knowledge base at authoring time, and an expert system and associated method for conducting the dialog with the user at run time as specified by the knowledge base. The expert system comprises a run-time program that conducts the dialog with the user, while the authoring system comprises an authoring program that allows the author to construct the knowledge base interactively. The present invention is the novel knowledge authoring system and method use by an expert system author for building the knowledge base of the expert system.

The knowledge base comprises communication cells for storing external data, assertion cells for storing data acquired from the user in the course of the dialog, and interaction cells that specify interactions with the user, which are carried out as the cells are invoked by the run-time program. Each interaction cell has an enabling condition that must be satisfied before it can be invoked.

The knowledge base also comprises computation cells that define intermediate results useful for the specification of the enabling conditions. The values of computation cells are given by formulas that refer to the values of assertion, communication, and computation cells, with no circular chains of references among the computation cells.

The dialog with the user is conducted by repeatedly invoking interaction cells. As each interaction cell is invoked, information received from the user is recorded in the assertion cells. After each invocation, the enabling conditions of those interaction cells that have not been invoked yet are evaluated, and those cells whose conditions are found to be satisfied become candidates for the next invocation. One of the candidates is chosen by heuristic criteria whose effect is to keep the dialog focused. The values of the computation cells are calculated if and when needed in the process of evaluating the enabling conditions. The values of the communication cells are updated asynchronously to the dialog as information is received from external sources. The dialog with the user is further described in U.S. patent application Ser. No. 08/371,630 to Corella et al., entitled EXPERT SYSTEM AND ASSOCIATED METHOD FOR CONDUCTING A DIALOG WITH A COMPUTER USER, filed on Jan. 12, 1995 which is herein incorporated by reference in its entirety.

At authoring time, the knowledge base is constructed by an expert system author who need not be a programmer or a knowledge engineer. The author allocates the knowledge base cells on a rectangular grid similar to a spreadsheet. The evaluation of formulas of computation cells and enabling conditions of interaction cells after changes in the values of assertion and communication cells is then akin to spreadsheet recalculation and can be observed on the grid. The author can try out various what-if scenarios by setting the values of assertion and communication cells. Construction of the knowledge base can be interleaved with simulation of the run-time behavior of the expert system for such what-if scenarios. The grid is only an authoring tool, which is not visible or present at run time.

Additional features and advantages of the invention will become apparent as the description proceeds in conjunction with the accompanying drawings.

BRIEF DESCRIPTION OF THE DRAWINGS

FIG. 5 shows an example of an authoring grid, where cells have been allocated for the knowledge base of a home health care application.

DETAILED DESCRIPTION OF THE INVENTION

The invention is concerned with two phases of activity, the construction of a knowledge base by an expert system author, henceforth called the author, and the use of the knowledge base to conduct a dialog with an expert system user, henceforth called the user. The construction phase is called authoring time, while the usage phase is called run time. At authoring time, the author can test the knowledge base as it is being constructed by simulating the run-time behavior of the expert system.

Figure 1:
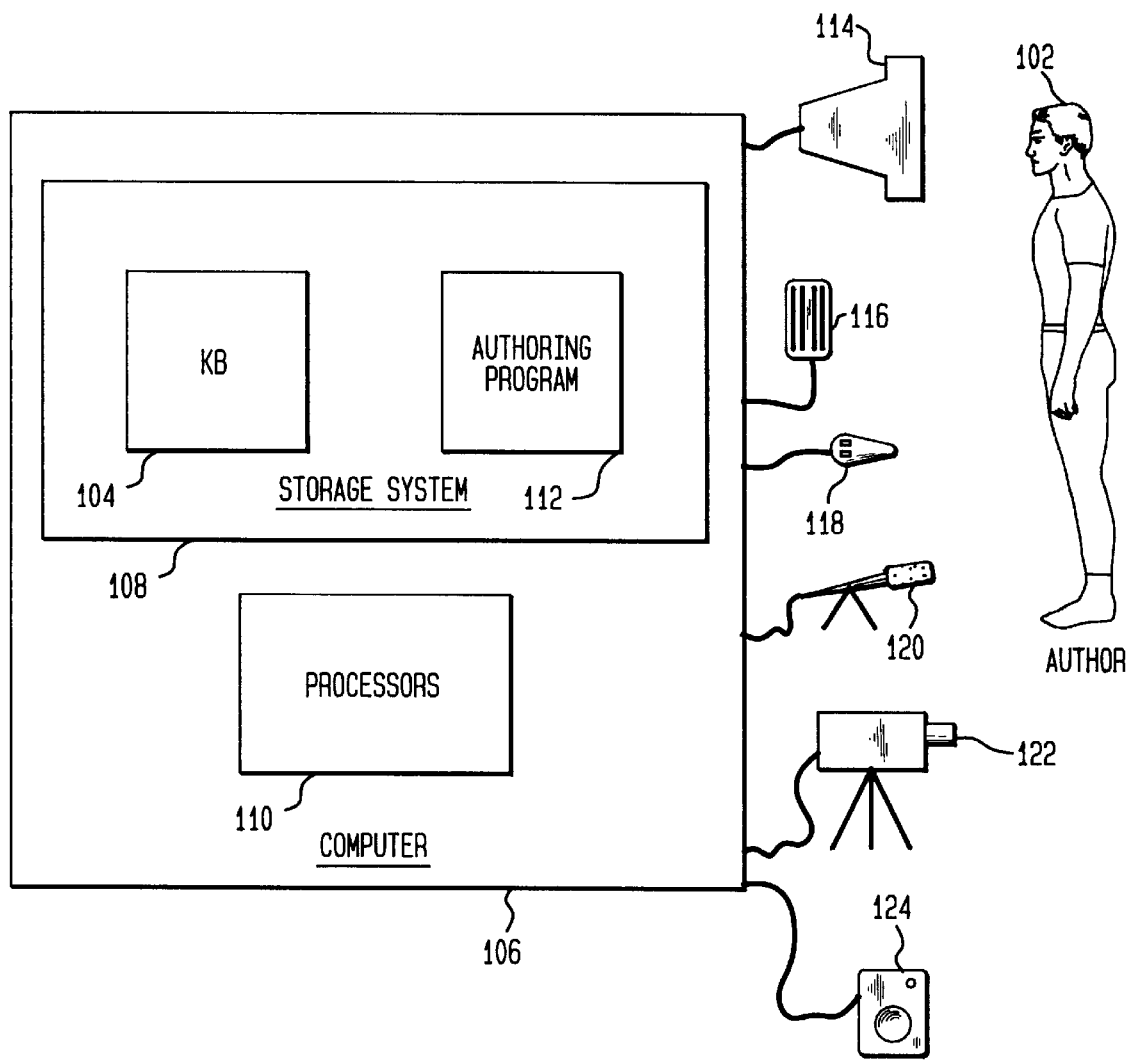
FIG. 1 shows a block diagram of a preferred embodiment of the authoring system.

FIG. 1 shows a preferred embodiment of the invention at authoring time. It shows an authoring system that enables the author 102 to construct the knowledge base 104 of an expert system. The authoring system comprises a computer with multimedia capabilities 106. In one preferred embodiment the computer 106 is an IBM Personal System/2 (PS/2) Model 8595 Microchannel Floor Standing 486 System 105 (described in the Quick Reference supplied with the system unit), equipped with an IBM PS/2 Action Media II Display Adapter 110 (described in the Action Media II Technical Reference), and running an IBM Operating System/2 (OS/2) 2.0 (described in the OS/2 2.0 Quick Reference) and an IBM Multimedia Presentation Manager/2 (described in the IBM Multimedia Presentation Manager/2 Action Media (R) II Media Control Interface Programming Guide and Reference).

The computer 106 comprises a storage system 108 for storing data and programs and one or more processors 110 for executing programs. The storage system contains the knowledge base being constructed 104 and an authoring program 112. The authoring program is executed at authoring time and constructs the knowledge base as directed by the author. The author communicates with the computer through a multimedia interface comprising a variety of input-output devices such as a computer display 114, possibly touch-sensitive, a keyboard 116, a mouse 118, a microphone 120, a video camera 122, and a loudspeaker 124. This collection of devices is given only as an example. The set of input-output devices to be used will depend on the particular expert system application. For some applications the traditional set of input-output devices, viz. display, keyboard, and mouse, may be sufficient. Thus a multimedia capability, although part of a preferred embodiment at authoring time, is not an absolute requirement.

In an alternative embodiment, the computer 106 is replaced with a distributed system comprising a server computer and a client computer connected through a local area network. The input-output devices are then connected to the client, while storage and processing are distributed over the server and the client computers.

Figure 2:
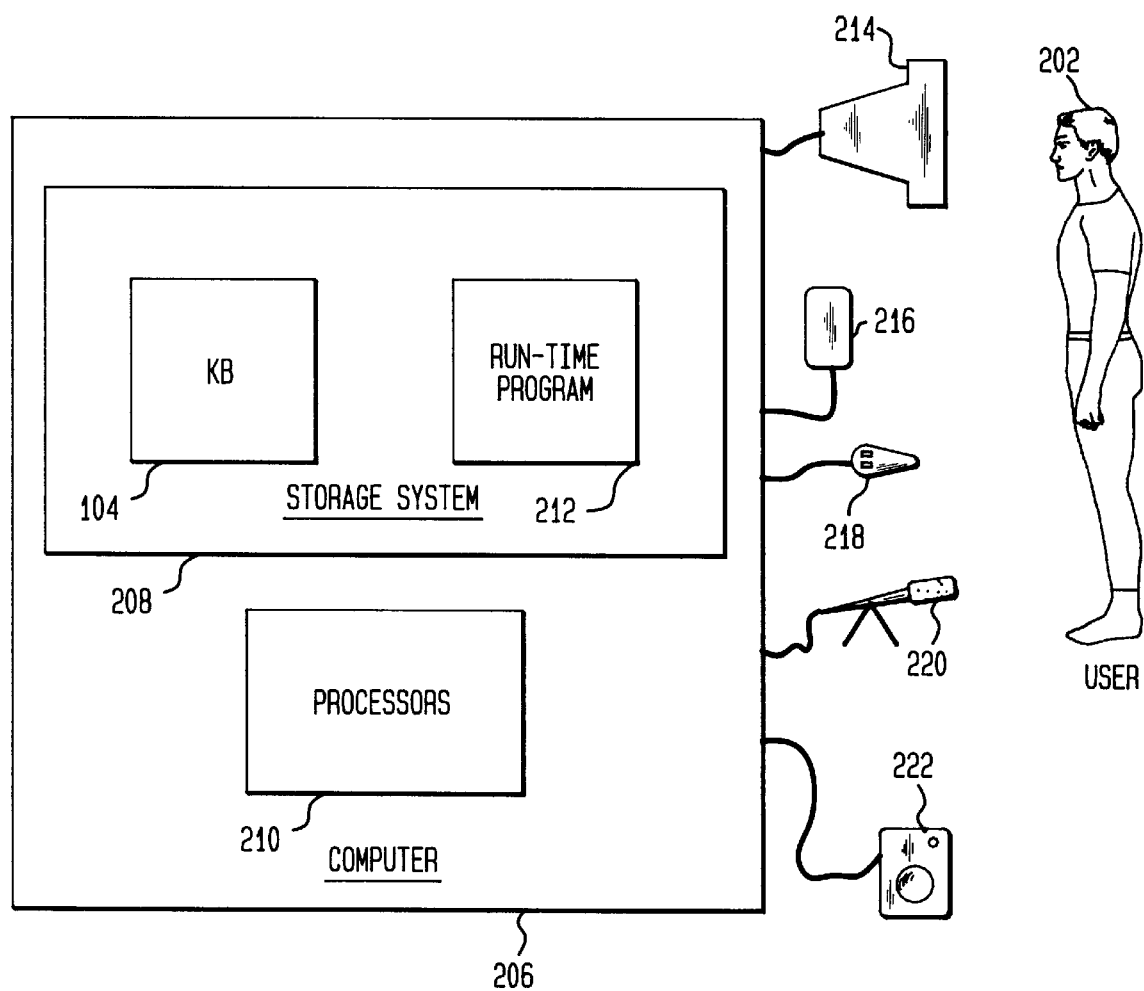
FIG. 2 shows a block diagram of a preferred embodiment of the run-time system.

FIG. 2 shows a preferred embodiment of the invention at run time. It shows an expert system that conducts a dialog with a user 202 using the knowledge base 104 that was constructed at authoring time by means of the authoring system of FIG. 1. The expert system comprises a computer with multimedia capabilities 206. In one preferred embodiment the computer 106 is an IBM Personal System/2 (PS/2) Model 8595 Microchannel Floor Standing 486 System 105 (described in the Quick Reference supplied with the system unit), equipped with an IBM PS/2 Action Media II Display Adapter 110 (described in the Action Media II Technical Reference), and running an IBM Operating System/2 (OS/2) 2.0 (described in the OS/2 2.0 Quick Reference) and an IBM Multimedia Presentation Manager/2 (described in teh IBM Multimedia Presentation Manager/2 Action Media (R) II Media Control Interface Programming Guide and Reference).

The computer 206 comprises a storage system 208 for storing data and programs and one or more processors 210 for executing programs. The storage system contains the knowledge base 104 constructed using the authoring system of FIG. 1, and a run-time program 212. The run-time program is executed at run time and conducts a dialog with the user as specified by the knowledge base. The user communicates with the computer through a multimedia interface comprising a variety of input-output devices such as a computer display 214, possibly touch-sensitive, a keyboard 216, a mouse 218, a microphone 220, and a loudspeaker 222. This collection of devices is given only as an example. The set of input-output devices to be used will depend on the particular expert system application. For some applications the traditional set of input-output devices, viz. display, keyboard, and mouse, may be sufficient. Thus a multimedia capability, although part of a preferred embodiment of the invention at run time, is not an absolute requirement.

In an alternative embodiment, the computer 206 is replaced with a distributed system comprising a server computer and a client computer connected through a local area network. The input-output devices are then connected to the client, while storage and processing are distributed over the server and the client computers.

The computer 106 used at authoring time and the computer 206 used at run time may or may not be the same. Typically, one computer will be used by the author to build the expert system at authoring time, and then multiple copies of the expert system will be installed on multiple computers and used at run time by multiple users. Fewer input-output devices may be needed at run time than at authoring time. For example, assume that a video-and-audio clip is part of the information to be presented to the user at run time. Then a camera and microphone will be needed at authoring time in order to record the clip, unless the clip is already available in a multimedia library. A computer display capable of displaying video and a speaker will also be needed at authoring time, so that the author can check the adequacy of the recorded clip. At run time only the video display and speaker are needed. The camera and microphone are not needed in connection with the video-and-audio clip. However, the microphone may still be needed for speech input.

Figure 3:
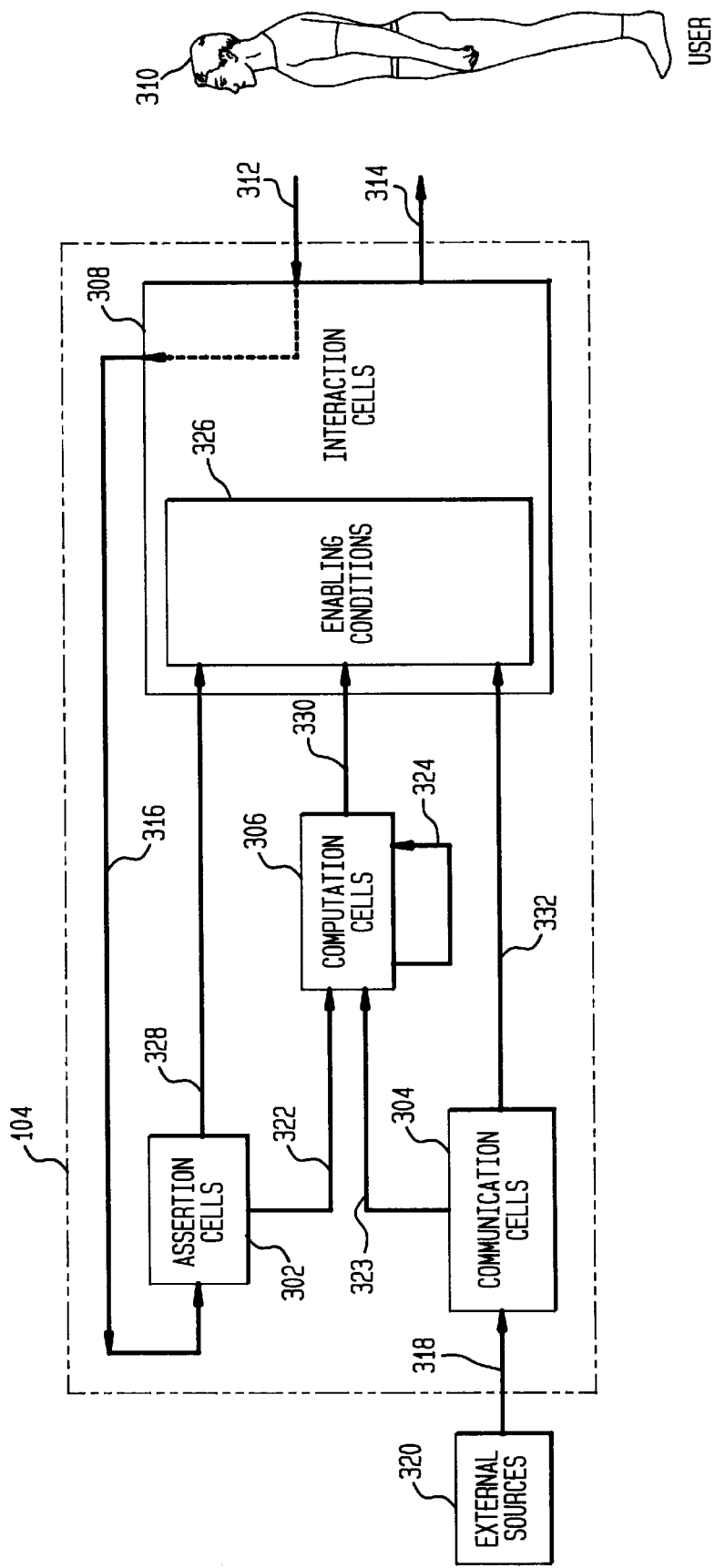
FIG. 3 is a block diagram showing an overview of the structure of the knowledge base showing the flow of information at run time.

FIG. 3 provides an overview of a knowledge base and shows the flow of information at run time.

The knowledge base 104 comprises four sets of knowledge base cells: the assertion cells 302, the communication cells 304, the computation cells 306, and the interaction cells 308. The communication cells 304 and the computation cells 306 are optional.

The interaction cells 308 specify interactions to be carried out with the user at run time. More precisely, each interaction cell specifies one or more interactions, an interaction being, for example, a question to be asked from the user, or some advice to be given to the user. It is said that a computer program "invokes" an interaction cell when it carries out the interactions specified by the cell. The run-time program 212 conducts the dialog with the user by sequentially invoking a series of interaction cells in a manner to be described below. The authoring program 112 can also invoke interaction cells in order to simulate the run-time behavior of the expert system.

The arrows in FIG. 3 represent flow of information at run time. The user 310 provides information 312 and receives information 314 from the knowledge base 104 as the interaction cells 308 are invoked by the run-time program. The information 312 obtained from the user is stored (316) in the assertion cells 302. The communication cells 304 receive information 318 from external sources 320 such as a second computer connected to the expert system computer 206 of FIG. 2 over a phone line or a computer network. An external source can also be a program that runs on the same computer 206 as the run-time program and communicates with the run-time program. The computation cells 306 have values given by formulas that refer to (322) the values of the assertion cells, (323) the values of the communication cells, and (324) the values of other computation cells. No circular chains of references are allowed among the computation cells. The enabling conditions 326 of the interaction cells are formulas that refer to (328) the values of the assertion cells, (330) the values of the communication cells, and (332) the values of the computation cells. More precisely, each interaction cell has one enabling condition whose value determines whether the interaction cell is enabled in a manner described below. An interaction cell can only be invoked at run time if it is enabled.

The knowledge base cells are data structures comprising a varying collection of components. The components of each kind of cell will be described below. The author creates the knowledge base cells at authoring time in the storage system 108 of the authoring system. When the knowledge base 104 is transferred from the authoring system to a run-time system, the knowledge base cells created by the author become data structures in the storage system 208 of the run-time system.

Figure 4:
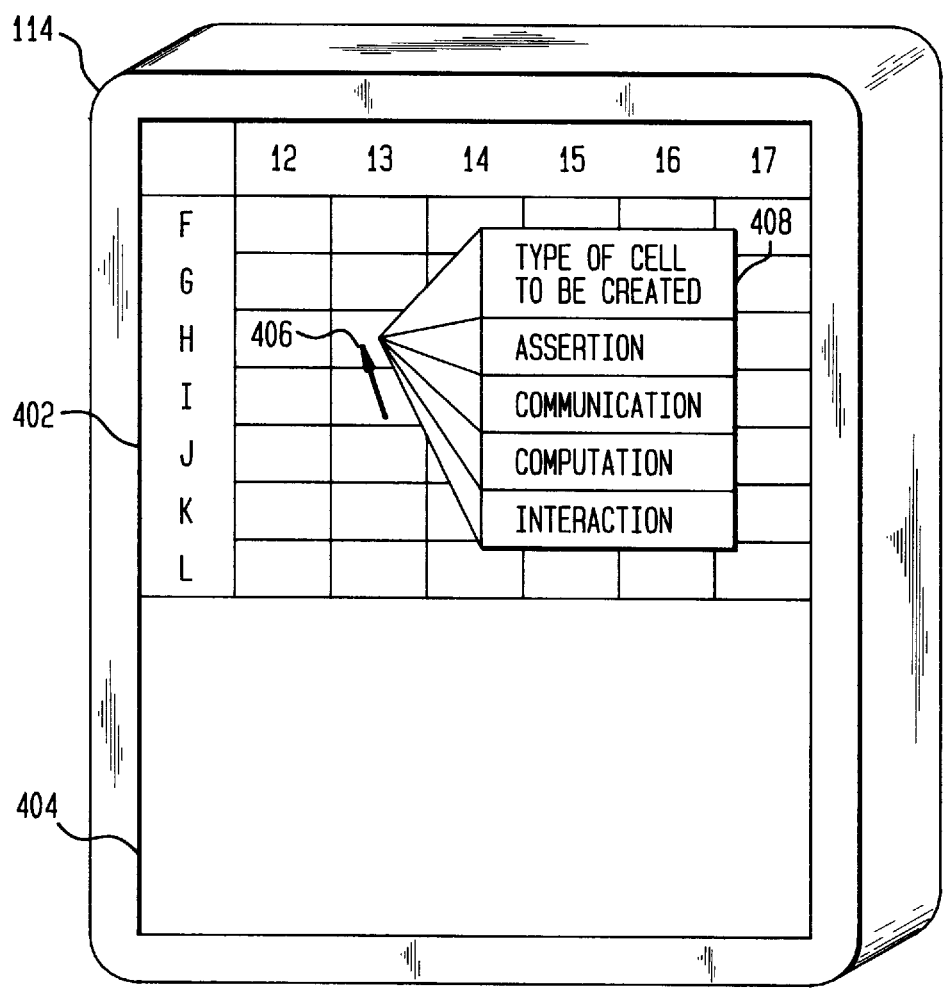
FIG. 4 illustrates the process by which the author allocates a knowledge base cell on an authoring grid similar to a spreadsheet.

In one preferred embodiment, the knowledge base cells are associated at authoring time with cells of a rectangular grid similar to a spreadsheet, called an authoring grid. FIG. 4 shows the computer display 114 of the authoring system displaying an authoring grid 402. The bottom of the screen is a control area 404 whose contents will be described in connection with FIG. 28.

Note that only part of the grid fits on the display. The grid can be scrolled by means well known in the prior art. In the example of FIG. 4, the grid is shown having been scrolled so that columns 1 through 11 and rows A through E are not displayed.

To create a knowledge base cell the author chooses a free grid cell, i.e. a grid cell that is not already associated with a knowledge base cell. A pointer 406 controlled by a pointing device such as the computer mouse 118 is used to point to the chosen grid cell, which in the example of FIG. 4 is the cell with grid coordinates H13. Then clicking on the left mouse button causes the pop-up menu 408 to be displayed. The author uses this menu to indicate the type of knowledge base cell to be created. Further pop-up menus or other means of interaction allow the author to specify the components of the data structures appropriate for the chosen kind of cell. The knowledge base cell is created as a data structure in the storage system 108, and associated with the grid cell.

The association between a knowledge base cell and a grid cell makes it possible for the author to point to the grid cell in order to refer to the associated knowledge base cell, and to use the coordinates of the grid cell as a reference to the knowledge base cell. The grid cell is further used to display the value of the associated knowledge base cell when the knowledge base cell is an assertion cell, a communication cell, or a computation cell; when the knowledge base cell is an interaction cell that has not yet been invoked, the associated grid cell displays the value of the enabling condition of the interaction cell. The values displayed on the grid cells are called simulation values because they are authoring-time values that simulate run-time values.

As in spreadsheets, more than one grid could be used. In that case grid cells would have three coordinates, one of them indicating the grid containing the cell while the two others specify the row and column of the cell.

The authoring grid or grids are an authoring tool that is only seen by the author. They are not seen by the user, and they are not part of the run-time system.

There are alternative embodiments in which no authoring grid is used. Means other than grid cells may be used to represent the knowledge base cells on the computer display and to display their simulation values. Furthermore, the knowledge base need not be constructed interactively. In an alternative embodiment, the author describes the collection of knowledge base cells using structured text written in a formal language. A knowledge-base compiler is used to create the knowledge base cells as specified by the structured text, and the author uses a testing system identical to a run-time system to test the knowledge base. In such an embodiment, the authoring system is comprised of the knowledge-base compiler and the testing system.

In a preferred embodiment where an authoring grid is used, knowledge base cells will be identified with their associated grid cells when there is no risk of confusion. Under this convention there are five kinds of grid cells: assertion cells, communication cells, computation cells, interaction cells, and free cells, the first four kinds of cells being knowledge base cells. A grid cell is said to be allocated as a knowledge base cell when it becomes associated with the knowledge base cell.

FIG. 5 shows an example of an authoring grid where several grid cells have been allocated as knowledge base cells. Only part of the grid is shown. The knowledge base is that of a home health care application that will be used henceforth as a running example. In the application, the expert system is installed at run time in the home of the patient, and a health-care provider, who can be a nurse or a relative of the patient, interacts with the expert system in order to provide information about the patient and receive advice and instructions on the patient's care.

In one preferred embodiment of the invention in which an authoring grid is used, each knowledge base cell has a name, which is displayed on the grid cell immediately above the grid cell allocated to represent the knowledge base cell. For example, in FIG. 5, ANC is the name of a knowledge base cell represented by the grid cell with coordinates B1. While the grid cell B1 shows a simulation value, 950, of the knowledge base cell, the name of the knowledge base is shown in the cell A1 immediately above B1. If the grid cell on which the name is to be displayed is not a free grid cell, then the name is not displayed. If the name does not fit in one grid cell it overflows to grid cells to the right, or is truncated if not enough free grid cells are available.

Both the name of the knowledge base cell and its grid coordinates (i.e. the coordinates on the grid of the associated grid cell) can be used as a reference to the knowledge base cell. Having two means of referring to a knowledge base cell is of course redundant. In alternative embodiments, one mean only, position or name, is used, this mean being the name in embodiments where no authoring grid is used.

Further details of FIG. 5 will be described below in conjunction with the features of the invention that they illustrate. It must be kept in mind that the grid of FIG. 5 is an authoring grid, and all the values displayed in FIG. 5 are authoring-time simulation values, notwithstanding the fact that they have been chosen to coincide with the values of run-time examples.

Figure 6:
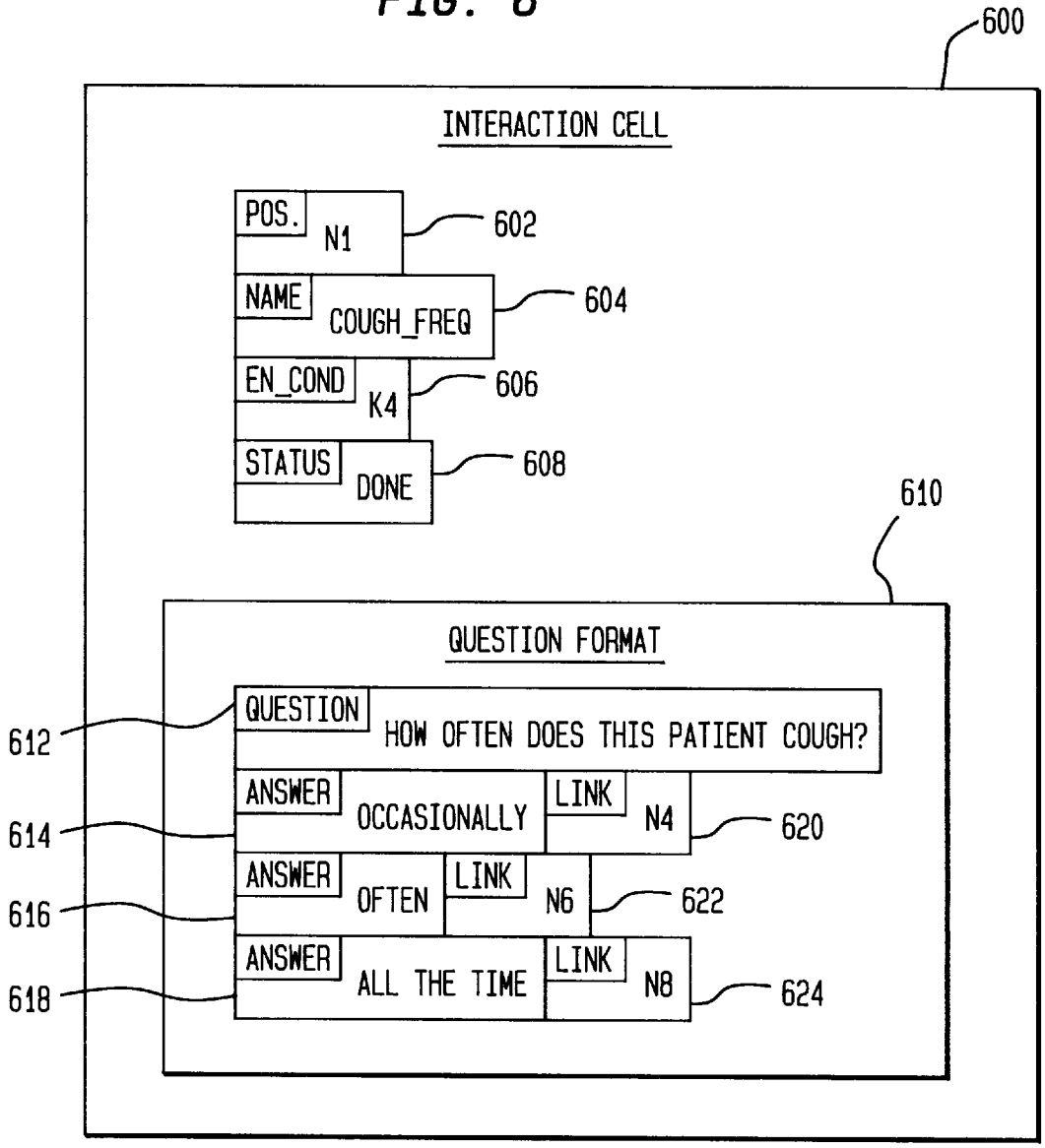
FIG. 6 shows an example of an interaction cell.

In one preferred embodiment of the invention in which an authoring grid is used, an interaction cell comprises a position field, a name field, an enabling condition field, a status field, and one or more interaction formats which are themselves composite data structures. The position field contains the grid coordinates of the interaction cell, while the name field contains the name. FIG. 6 shows an example of an interaction cell 600 comprising the following components:

1. A position field 602, labeled POS, containing the coordinates N1.

2. A name field 604, labeled NAME, containing the name "COUGH_FREQ". The purpose of the cell is to obtain information from the user, i.e. the home health-care provider, about the frequency of the patient's cough.

3. An enabling condition field 606, labeled EN_COND, containing the enabling condition "K4". In general, an enabling condition is a formula containing references to the values of assertion, communication, and computation cells, which determines whether the interaction cell is enabled. In one preferred embodiment, the enabling condition is satisfied and the interaction cell is enabled when the formula takes any value other than NIL. In this particular example the enabling condition is the formula comprised of a single reference to the cell with coordinates K4; the interaction cell is therefore enabled when the value of the cell K4 is other than NIL.

4. A status field 608, labeled STATUS, containing the keyword DONE. In one preferred embodiment, the status field of any interaction cell contains either the keyword READY or the keyword DONE. The status is READY at the beginning of the run-time use of the expert system, and becomes DONE once the cell has been invoked. While the status is READY, when the cell becomes enabled, it becomes a candidate for invocation by the run-time program. In the example, the status is DONE.

5. An interaction format 610 which is a QUESTION FORMAT. A question format further comprises a QUESTION field containing the text of a question to be posed to the user and one or more ANSWER fields, each coupled with a LINK field containing a reference (by name or by coordinates) to an assertion cell. The answer fields contain a menu of answers that are displayed to the user and from which the user may make zero of more selections. To select an answer is to make an assertion, which is recorded by storing the value TRUE in the linked assertion cell, i.e. in the assertion cell specified by the link field coupled with the answer field. In the example, the question field 612 contains the question "How often does the patient cough?" and there are three answer fields 614, 616, 618 containing the possible answers "occasionally", "often", "all the time" linked to the assertion cells N4, N6, N8 by the link fields 620, 622, 624. For the user to select the answer "often" is to make the assertion that the patient coughs often. Such an assertion would be recorded in the linked assertion cell N6.

Figure 7:
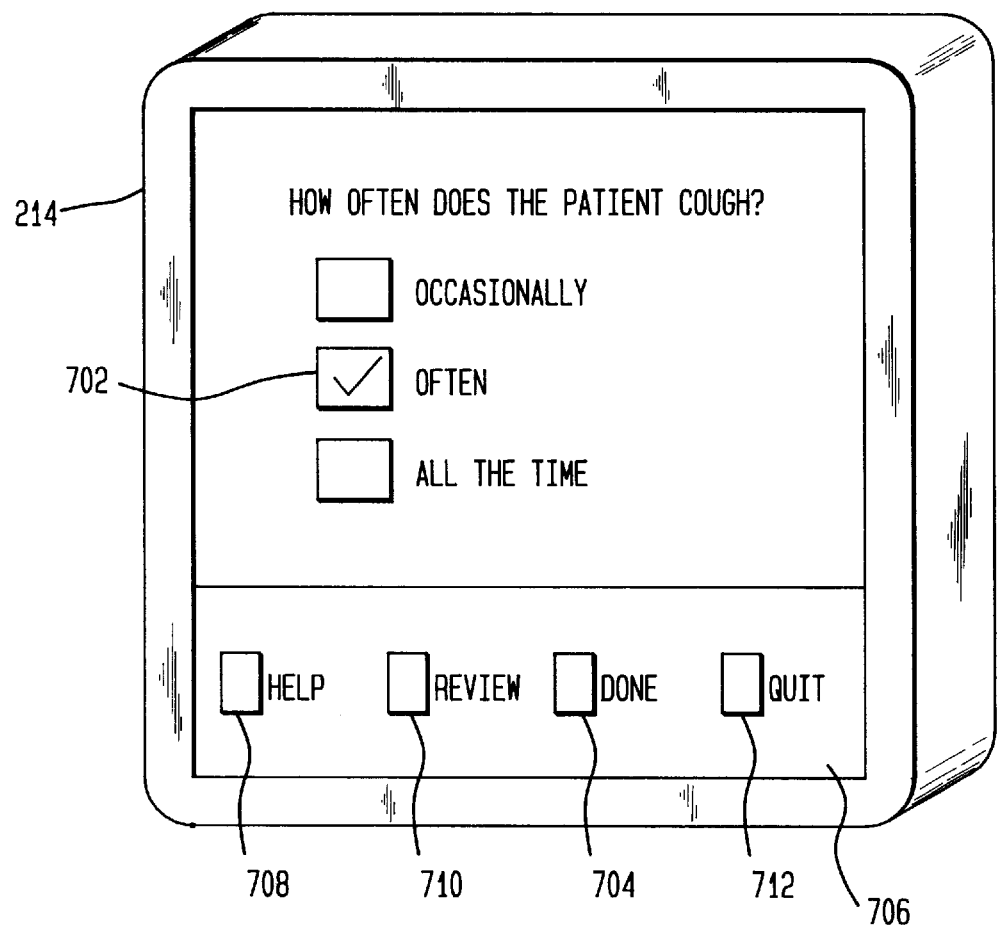
FIG. 7 shows a preferred appearance of the computer display when the interaction cell of FIG. 6 is invoked at run time.

FIG. 7 shows a preferred appearance of the run-time computer display 214 when the interaction cell of FIG. 6 is invoked by the run-time program. The display is touch-sensitive and the user makes a selection by touching the box to the left of an answer, which causes a check mark to be displayed in the box. The figure shows that the user has touched the square 702 and thus selected the answer "often". The user terminates the interaction by pressing the button 704 labeled "Done" situated at the bottom of the display, in an area 702 of the display called the control area. Pressing the button 704 causes the invocation of the interaction cell to conclude, and the status of the interaction cell to change from READY to DONE.

Figure 8A:
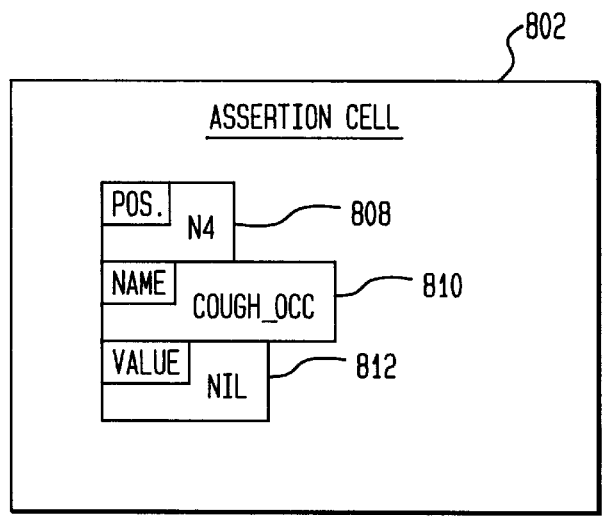
FIG. 8 shows a set of three assertion cells (FIGS. 8A, 8B, and 8C), linked to the interaction cell of FIG. 6, which are logical assertion cells.
Figure 8B:
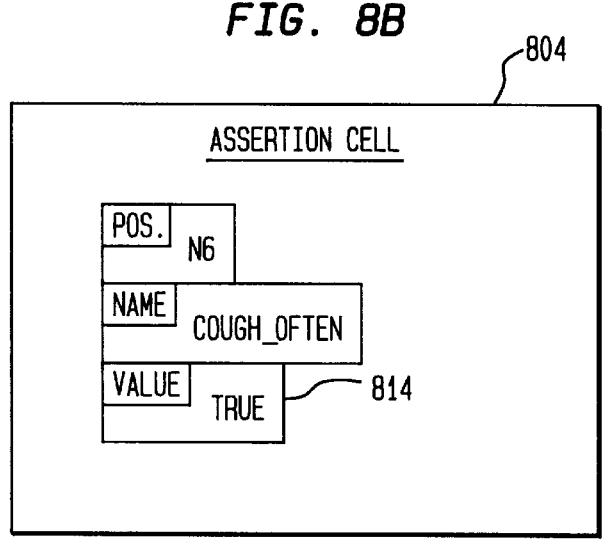
Figure 8C:
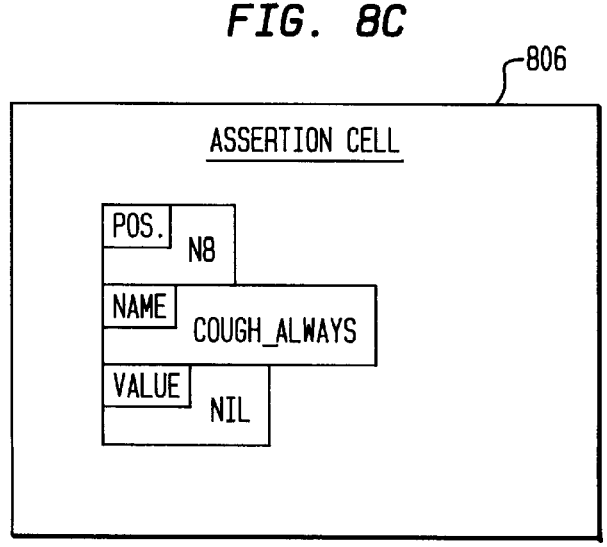

FIG. 8 shows the assertion cells 802, 804, and 806, which are linked to the interaction cell 600 by links 620, 622, and 624 respectively. In one preferred embodiment in which an authoring grid is used, each assertion cell has a position field that contains the coordinates of the cell on the authoring grid, a name field, and a value field. For example, the assertion cell 802 has a position field 808, labeled POS, containing the cell's coordinates N4, a NAME field 810 containing the cell'ss name "COUGH_OCC", and a VALUE field 812 containing the cell's value NIL. The coordinates N4, N6, and N8 of the three cells show that these are indeed the assertion cells linked to the interaction cell 600 by links 620, 622, and 624 respectively. The cell 804 is shown with a VALUE field 814 containing the value TRUE, recording the assertion that the patient coughs often, made by the user's selection of the answer "often" shown in FIG. 7.

An assertion cell may be linked to multiple interaction cells. It may then receive values when any of those cells are invoked.

If any of the assertion cells 802, 804, or 806 has already the value TRUE when the interaction cell of FIG. 6 is invoked, the corresponding box on the computer display shown in FIG. 7 has a check mark at the beginning of the interaction. Thus each box reflects the value of the corresponding assertion cell: a check mark means TRUE, the absence of a check mark means NIL. An assertion cell that can take only the two values TRUE or NIL is called a logical assertion cell. The keyword TRUE is the true logical value and the keyword NIL is the false logical value. (In other embodiments the logical values could be TRUE and FALSE, or 1 and 0, instead of TRUE and NIL.) An assertion that can take values other than logical values is called a data assertion cell.

Refer back to FIG. 7. The control area 706 further contains a button 708 labeled "Help", a button 710 labeled "Review" and a button 712 labeled "Quit". Pressing the "Help" button 708 produces information on the use of the expert system at run time. Pressing the "Review" button 710 causes the expert system to enter a mode in which previous interactions can be replayed and previously entered answers and data can be modified. Pressing the "Quit" button 712 ends the dialog with the user.

Refer back to the authoring grid of FIG. 5 and the interaction cell of FIG. 6. The author has allocated the grid cell with coordinates N1 to be the interaction cell 600. The name COUGH_FREQ of the cell is displayed on the cell M1 above N1, overflowing into the cell M2. The grid cell N1 itself displays the keyword DONE. This is a simulation status, indicating that the interaction cell has already been invoked in the course of a simulation. If the simulation status had been READY, the cell N1 would have displayed instead the simulation value of the enabling condition formula K4. When the simulation status of an interaction cell is DONE, the simulation value of the enabling condition is irrelevant and need not be displayed. The enabling condition formula is not shown on the authoring grid, but the author can view it (and change it) by editing the cell as discussed below in connection with FIG. 30.

The assertion cells of FIG. 8 linked to the interaction cell 600 can also be seen in FIG. 5. The grid cells with coordinates N4, N6, and N8 have been allocated as the assertion cells 802, 804, and 806 respectively. They show simulation values NIL, TRUE, and NIL respectively, that coincide with the run-time values in the example of FIGS. 7–8. The name "COUGH_OCC" of the assertion cell 802 is shown in positions M4 and M5 above and to the right of the allocated grid cell N4. Similarly, the name "COUGHH_OFTEN" of the assertion cell N6 is shown in positions M6 and M7, and the name "COUGH_ALWAYS" of the assertion cell N8 is shown in positions M8 and M9.

Figure 9:
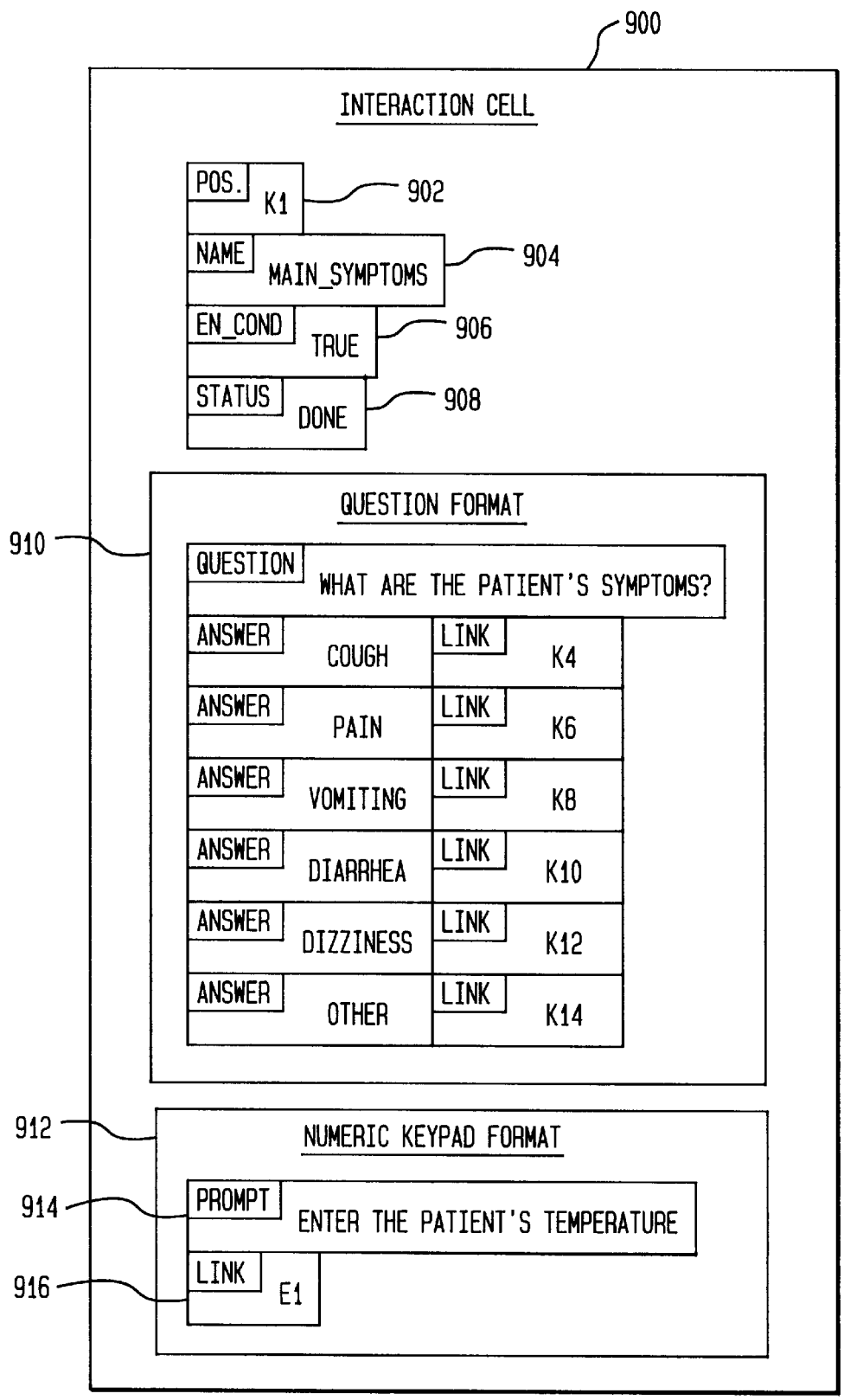
FIG. 9 shows an example of an interaction cell containing two interaction formats.

FIG. 9 shows an interaction cell 900 containing two interaction formats. The coordinates 902 of the cell are K1, its name 904 is MAIN_SYMPTOMS, its enabling condition 906 is the constant formula TRUE, which means that the cell is always enabled, and its status field 908 is shown containing the value DONE.

The first interaction format is a question format 910 similar to the question format 610 of the cell 600. The possible answers "cough", "pain", "vomiting", "diarrhea", "dizziness", and "other", are linked to the assertion cells with grid coordinates K4, K6, K8, K10, K12, and K14 respectively.

The second interaction format 912 is a NUMERIC KEYPAD FORMAT which illustrates the use of a touch-sensitive computer display to enter a numeric value. This format has only a PROMPT field 914 containing the text "Enter the patient's temperature", and a LINK field 916 that refers to the assertion cell with grid coordinates E1. The assertion cell E1, as well as the assertion cells K4, K6, K8, K10, K12, and K14, are all said to be linked to the interaction cell 900.

Figure 10:
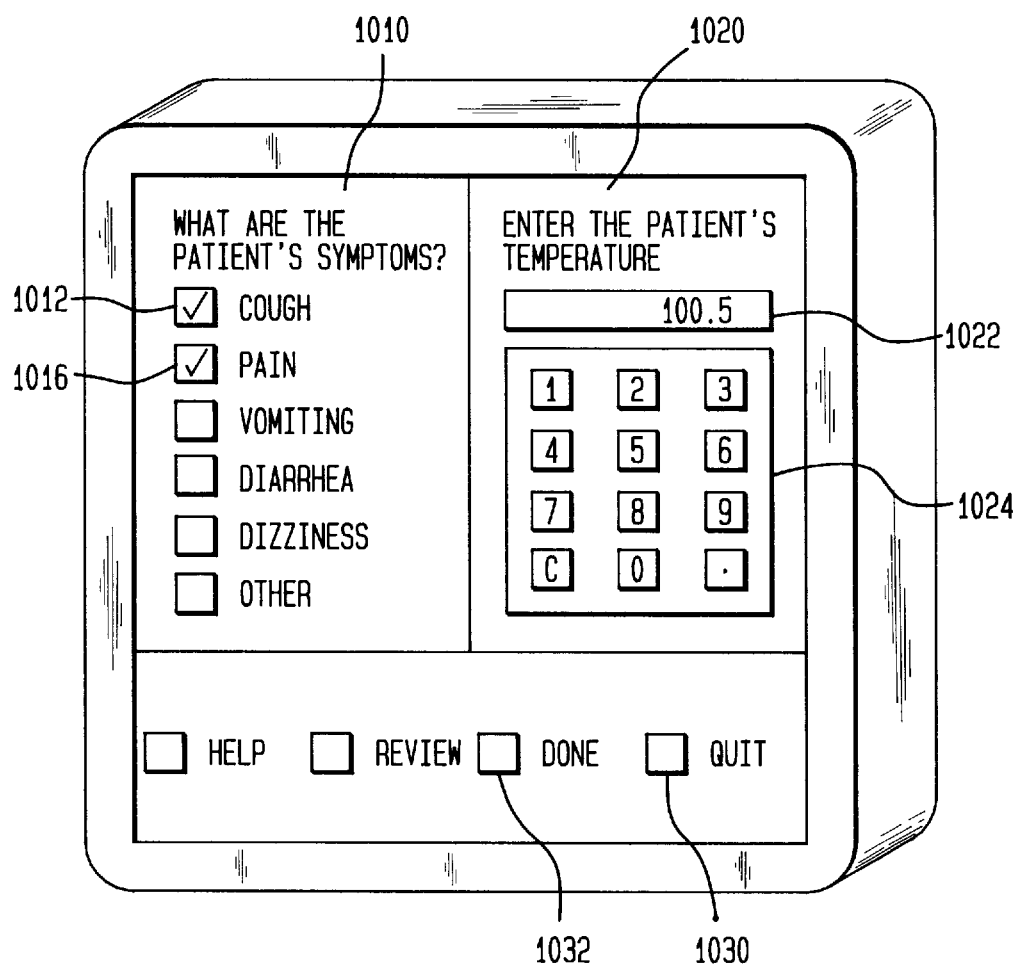
FIG. 10 shows a preferred appearance of the computer display when the interaction cell of FIG. 9 is invoked at run time.

FIG. 10 shows the appearance of the display when the interaction cell 900 is invoked at run time, or during a simulation at authoring time. The display is divided in three areas 1010, 1020, 1030.

The area 1010 displays the question of the question format and the menu of possible answers, as in FIG. 7. Check marks appear on the button 1012 next to the answer "cough" and on the button 1014 next to the answer "pain". This indicates that the current values of the linked assertion cells K4 and K6 are TRUE, while those of the other linked assertion cells are NIL. Recall that K4 is the enabling condition of the "COUGH_FREQ" interaction cell 600. When the user selects "cough" as a main symptom, the assertion cell K4 takes the value TRUE, and the interaction cell that asks the question "How often does the patient cough" becomes enabled.

The area 1020 displays the PROMPT "Enter the patient's temperature"; the temperature can be entered in the window 1022 by touching the keys of the numeric keypad 1024.

As in FIG. 7, the control area 1030 contains a button 1032 labeled "Done" which can be pressed to terminate the interaction.

Figure 11:
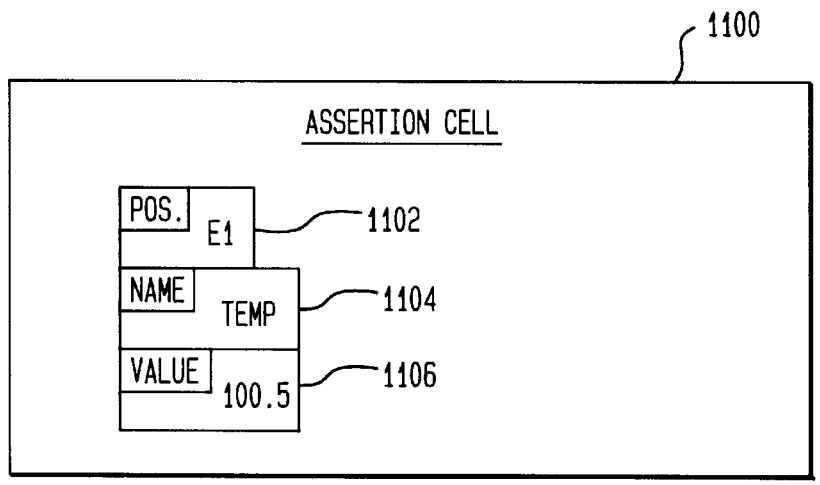
FIG. 11 shows an example of a data assertion cell, which contains a numeric value and is linked to the second interaction format of the interaction cell of FIG. 9.

FIG. 11 shows the linked assertion cell 1100 with coordinates E1 specified by the LINK field 916. The POS field 1102 contains the coordinates E1, the NAME field 1104 contains the name TEMP, and the VALUE field 1106 contains the value 100.5 shown in FIG. 10 as having been entered in the window 1022.

In contrast with the logical assertion cells of FIG. 8, which are used to store the logical values TRUE or NIL, the assertion cell 1100 is a data assertion cell. More specifically, it is a numeric assertion cell that stores a numeric value representing the patient's temperature, or the value NIL if the user has not entered the patient's temperature yet. Thus the keyword NIL is used both as a false logical value, and as a null value of any type indicating, by convention, an absence of information. These two uses are consistent if the two possible values of a logical assertion cell are taken as meaning "the assertion has been" vs. "the assertion has not been made" rather than "the assertion is true" vs. "the assertion is false".

If the value stored in the assertion cell 1100 is NIL when the interaction cell 900 is invoked, the window 1022 is empty at the beginning of the interaction. If the assertion cell 1100 contains a value other than NIL, this value is displayed in the window 1022 at the beginning of the interaction. Thus the window 1022 always reflects the value of the linked assertion cell, with the convention that the null value NIL is reflected by an empty window.

The grid cell K1 associated with the interaction cell 900 as well as some of the assertion cells linked to it can be seen in FIG. 5. The grid cell E1 allocated to represent the linked assertion cell 1100 shows a simulation value 100.5 that coincides with the run-time value in the example of FIGS. 10–11. The name of the cell, "TEMP", is displayed on the free grid cell D1 above the allocated grid cell. The cells K4 and K6 linked to the answers "cough" and "pain" display the simulation value TRUE, while K8 and K10, linked to "vomiting" and "diarrhea", are seen with the simulation value NIL.

Figure 12:
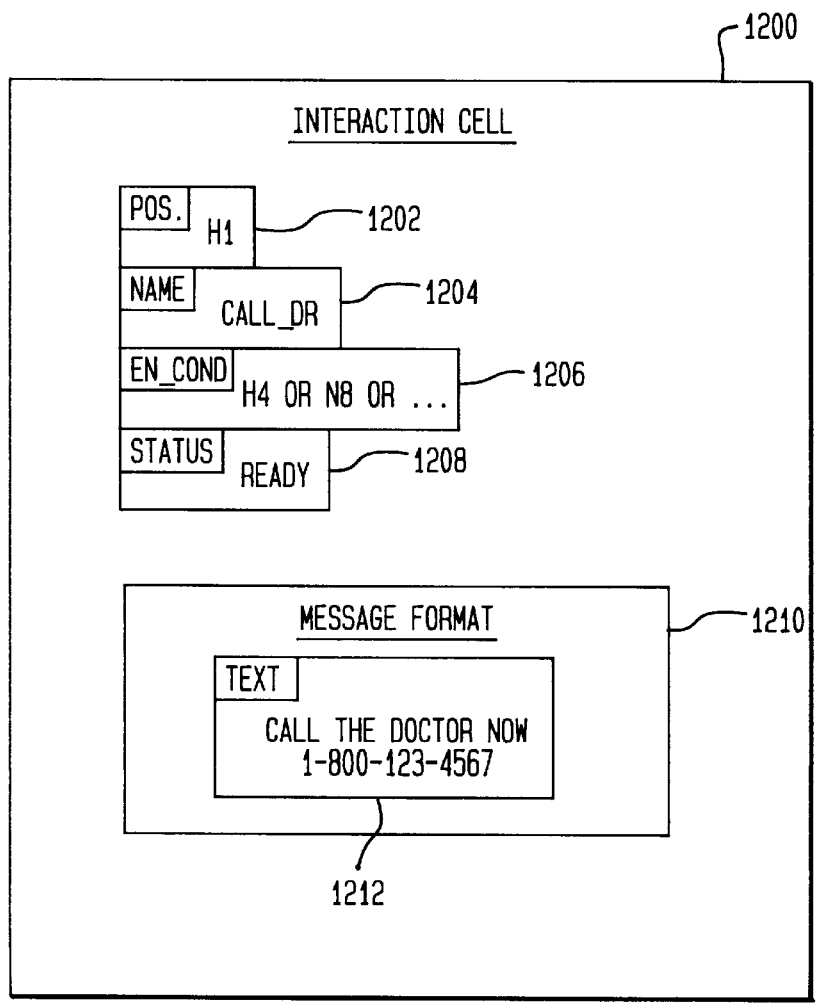
FIG. 12 shows an example of an interaction cell containing a message format.

FIG. 12 shows an interaction cell 1200 whose purpose is to provide information to the user rather than to obtain information from the user. Like other interaction cells, it comprises a position field 1202, containing the coordinates H1, a name field 1204, containing the name CALL_DR, an enabling condition field 1206, containing the formula "H4 OR N8 OR . . . " (i.e. a disjunction whose first two disjuncts are "H4" and "N8"), and a status field 1208, shown containing the keyword READY. More will be said on the enabling condition after computation cells have been discussed.

The interaction cell 1200 further comprises one interaction format 1210, which is a MESSAGE FORMAT. A message format contains only a TEXT field 1212 that specifies the text of the message. Note that the interaction format 1210 contains no LINK fields. Consequently there are no assertion cells linked to the interaction cell 1200.

Figure 13:
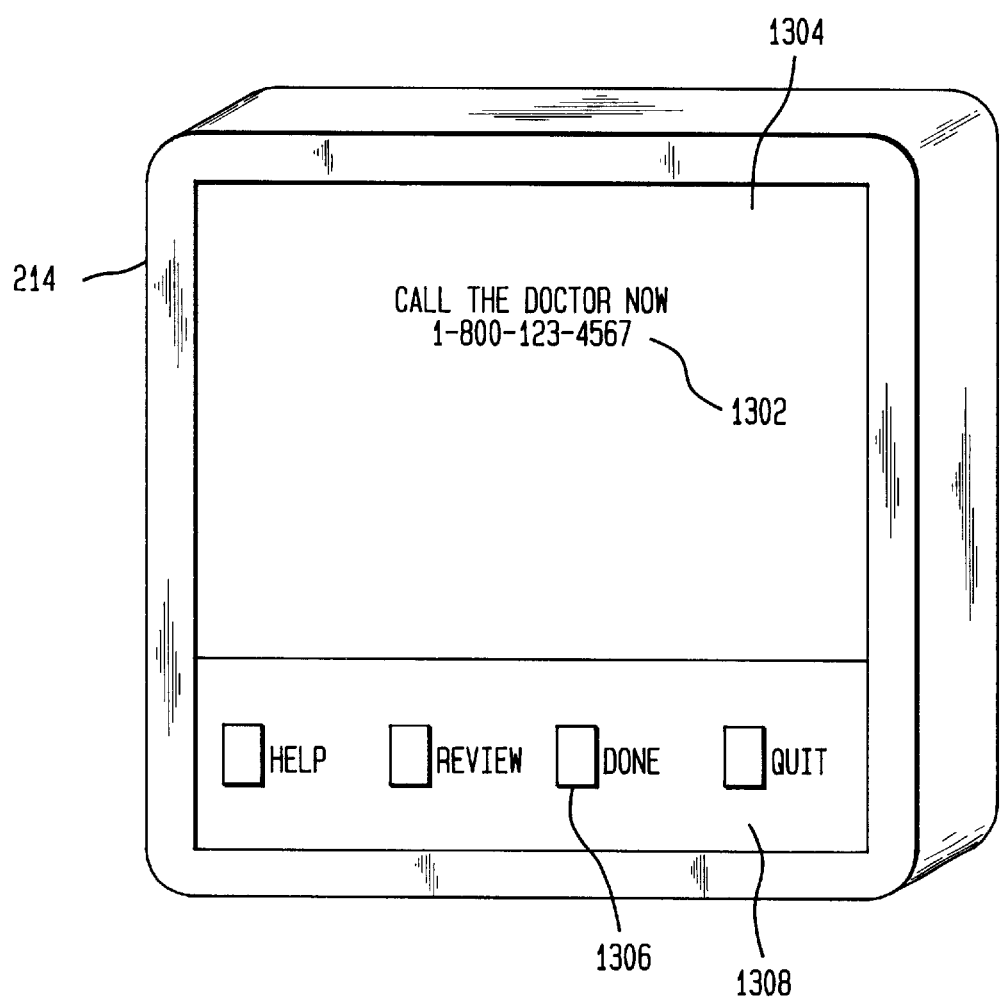
FIG. 13 shows a preferred appearance of the computer display when the interaction cell of FIG. 12 is invoked at run time.

FIG. 13 shows how the appearance of the computer display 214 when the interaction cell 1200 is invoked at run time. The message 1302 is displayed in the area 1304 allocated to the message format, and remains on the display until the user presses the "Done" button 1306 situated in the control area 1308.

The interaction cell 1200 is also shown on the grid of FIG. 5. The allocated grid cell H1 shows the simulation value of the enabling condition as being TRUE, while the cell G1 displays the contents of the NAME field.

Figure 14:
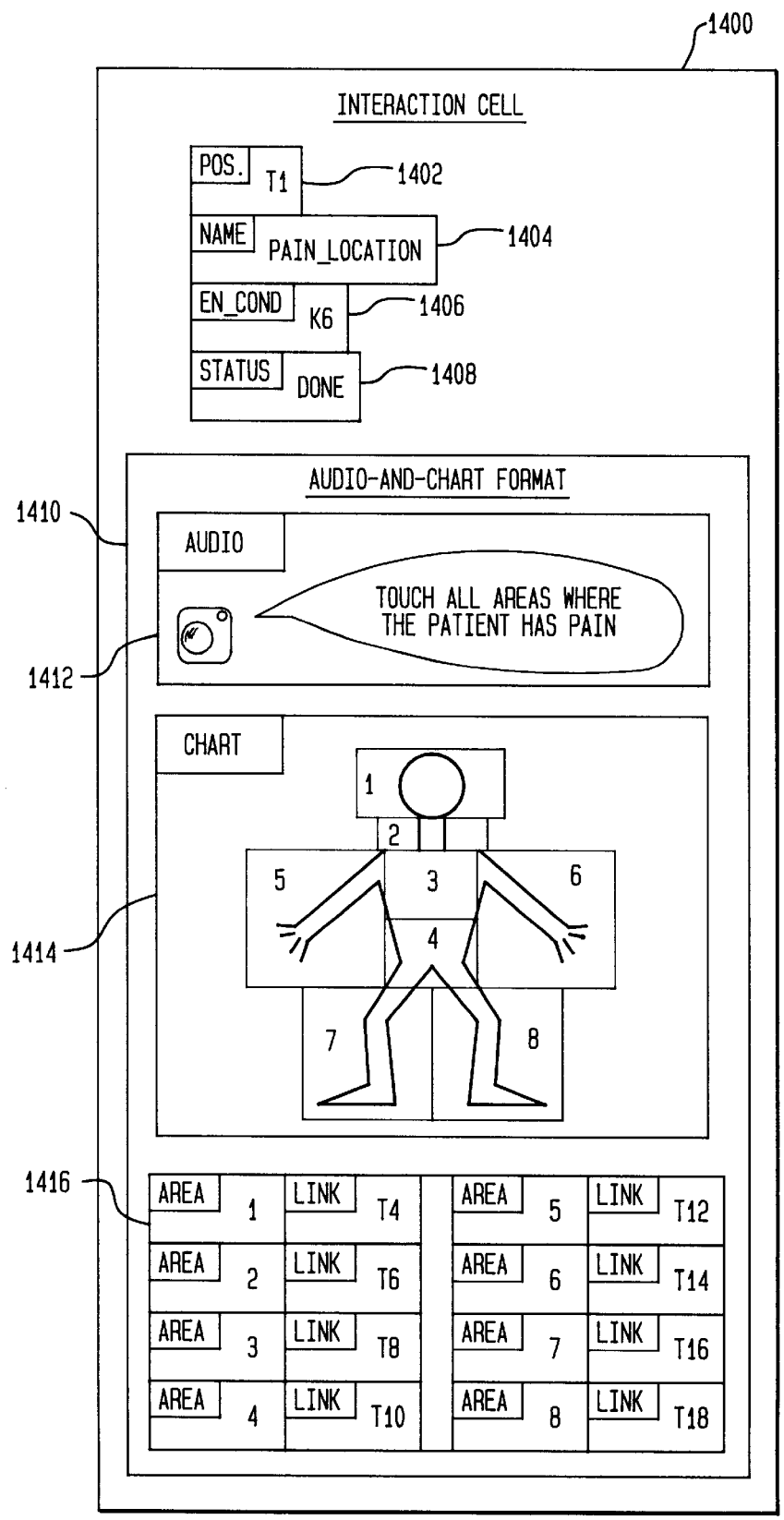
FIG. 14 shows an example of an interaction cell containing a multimedia format.

FIG. 14 illustrates the use of multimedia to facilitate the interaction with the user. It shows an interaction cell 1400 that comprises a position field 1402 containing the coordinates T1, a NAME field 1404 containing the name "PAIN_LOCATION", an enabling condition field 1406 containing the formula "K6", and a status field 1408 containing the keyword "DONE". Since K6 is the assertion cell linked to the answer "pain" in the question format 910 of FIG. 9, the interaction cell 1400 becomes enabled when the user selects "pain" as a main symptom.

The interaction cell 1400 further comprises one interaction format 1410, which is a multimedia format. More specifically, the interaction format 1410 is called an AUDIO-AND-CHART FORMAT. It comprise an AUDIO field 1412 that contains an audio clip and a CHART field 1414 that contains a body chart with touch-sensitive areas. The AUDIO field 1412 could contain a pointer to an audio clip stored in a multimedia library, rather than the audio clip itself. Similarly, the CHART field 1414 could contain a pointer to a chart stored in a multimedia library, rather than the chart itself.

The interaction format 1410 further comprises a table 1416 that associates each touch-sensitive area in the chart with an assertion cell. These assertion cells, specified in the LINK fields of the table, arc said to be linked to the interaction cell 1400.

Figure 15:
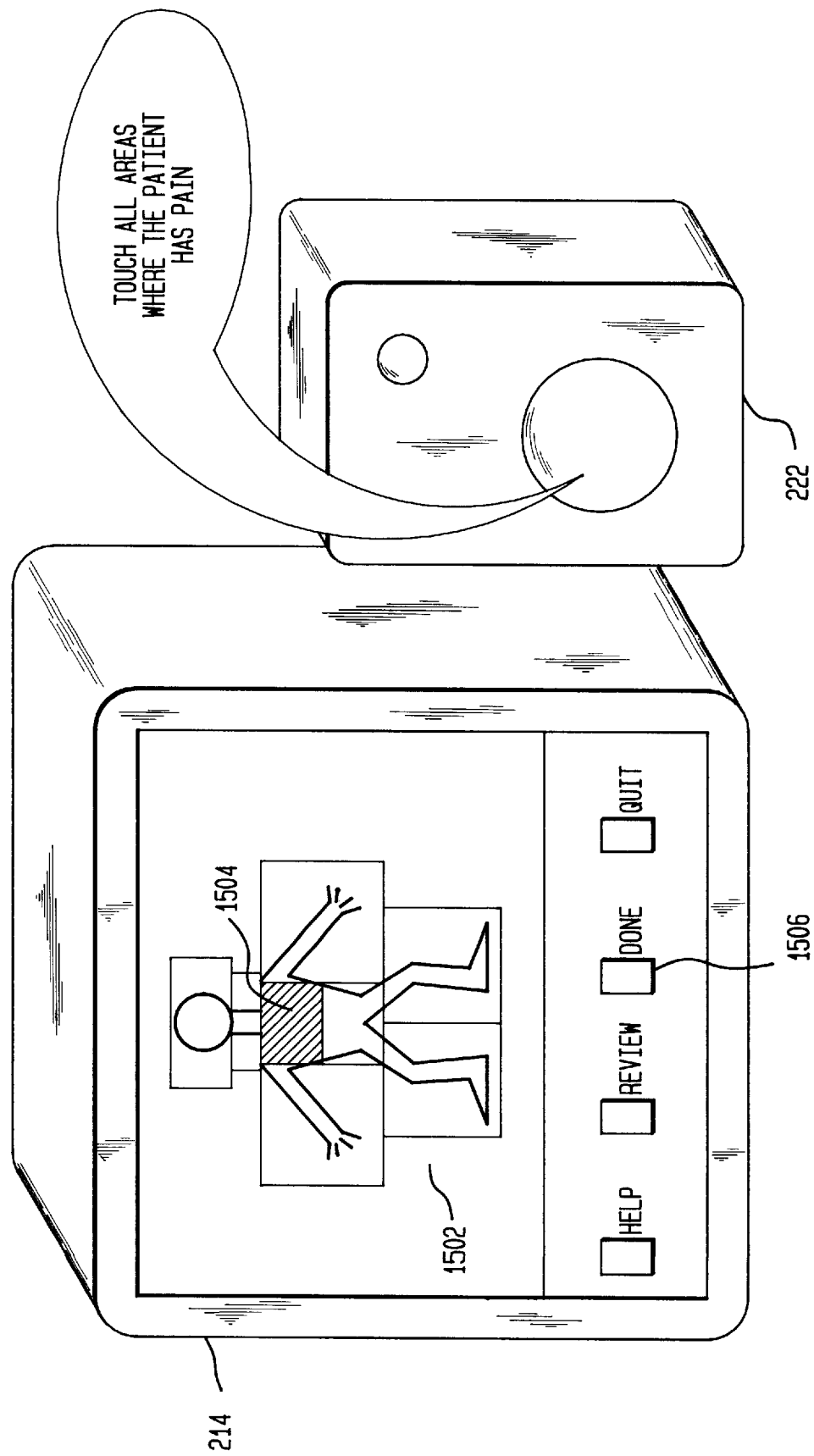
FIG. 15 shows the interaction that takes place when the cell of FIG. 14 is invoked at run time.

FIG. 15 shows the interaction that takes place with the user when the interaction cell 1400 is invoked at run time. The computer display 214 displays the body chart 1502 specified by the CHART field 1414. The speaker 222 plays the audio clip specified by the AUDIO field 1412, which instructs the user to touch all areas where the patient has pain. Touching an area causes it to become highlighted, while touching a highlighted area causes it to revert to its normal non-highlighted appearance. As always, the user terminates the interaction by pressing the "Done" button 1506.

Figure 16A:
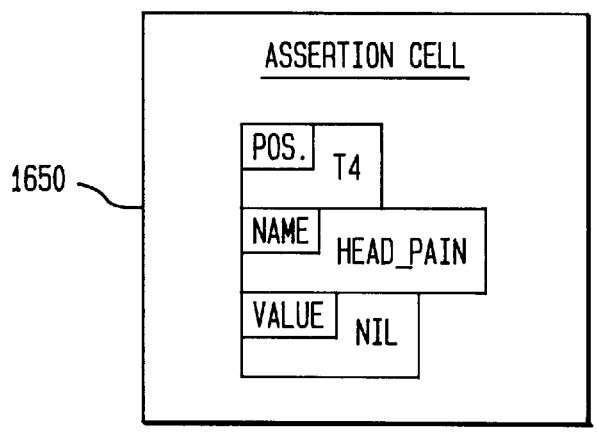
FIG. 16 shows a sample of three logical assertion cells (FIGS. 16A, 16B, and 16C) linked to the interaction cell of FIG. 15.
Figure 16B:
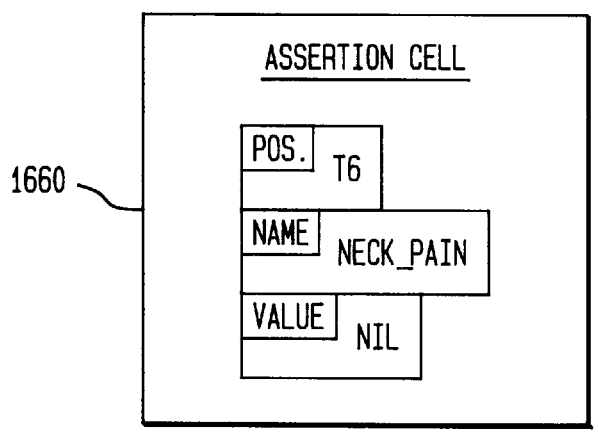
Figure 16C:
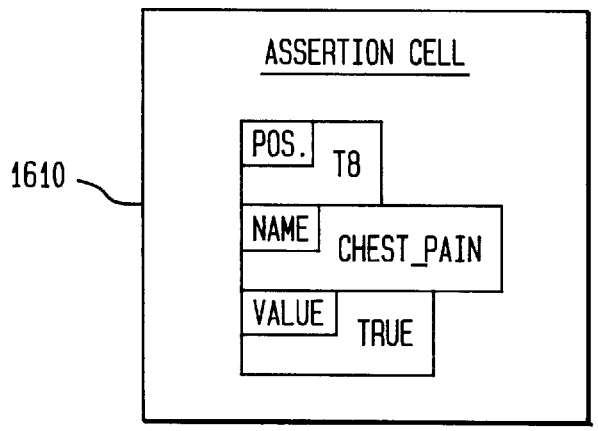

The chart 1502 reflects the values of the assertion cells linked to the interaction cell 1400. If an area is highlighted, the assertion cell linked to that area has the value TRUE. If an area is not highlighted, the assertion cell linked to that area has the value NIL. Assume, for example, that the chest area 1504 is highlighted, indicating that the patient has chest pain, as shown in FIG. 15. Table 1416 specifies that the chest area, which is area no.3, is linked to the assertion cell with coordinates T8. The value of that cell is then TRUE, while the value of the other linked assertion cells is NIL. FIG. 16 shows the assertion cell 1610 that is used to record chest pain having the value TRUE, and the assertion cells 1650 and 1660, used to record head and neck pain respectively, having the value NIL. The grid cells T1, T4, T6, and T8 allocated to represent the interaction cell 1400 and the linked assertion cells 1650, 1660, and 1610 respectively can be seen on the authoring-time grid of FIG. 5.

Certain assertions only make sense under certain restricted circumstances. For example, the assertion that there is blood in the patient's diapers only makes sense if the patient is less than 4 years old. In an alternative embodiment, some of the assertion cells have an additional field that contains an enabling condition for the cell. The enabling condition of an assertion cell is a formula, just like the enabling condition of an interaction cell. An assertion cell is disabled when it has an enabling condition field, and the current value of the enabling condition is NIL. The value of an assertion cell is forced to be NIL when the cell is disabled. The enabling conditions of assertion cells are called assertion enabling conditions.

Figure 17:
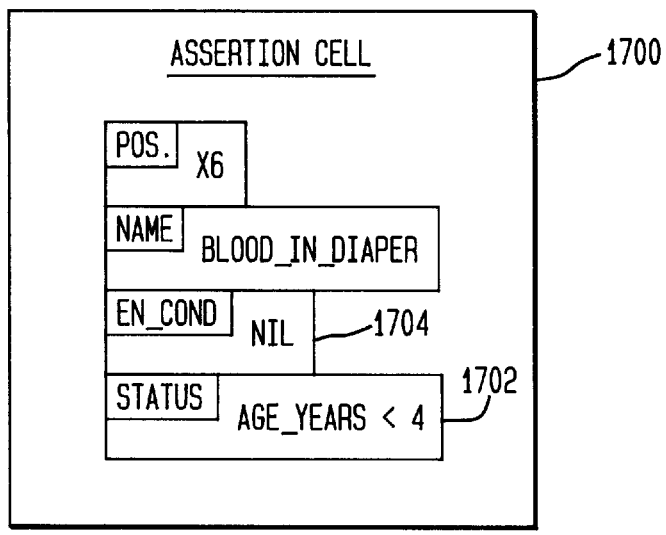
FIG. 17 shows an example of an assertion cell having an enabling condition.

For example, FIG. 17 shows an assertion cell 1700 that records the assertion that there is blood in the diapers. It has an enabling condition field 1702 containing the formula "AGE_YEARS<4", where AGE_YEARS is the name of an assertion cell that contains the age in years of the patient. The value of this formula is TRUE if the age in years of the patient has been entered and is less than 4 years old; the value is NIL otherwise. A value other than NIL cannot be entered in the VALUE field 1704 if the value of the enabling condition is NIL. In one preferred embodiment this is enforced by removing or deactivating every answer linked to the assertion cell 1700 in every question format or other interaction format that would otherwise allow the user to enter such an answer. Furthermore, if the enabling condition becomes NIL while the value of the assertion cell 1700 is TRUE, the value of the assertion cell is changed to NIL.

In one preferred embodiment where an authoring grid is used, the keyword "DISABLED" is displayed in the grid cell allocated to represent an assertion cell which is currently, instead of the value of the cell.

A communication cell records an information item that originates from an external source. The external source can be a different computer connected at run time to the run-time computer 206, or a program running on the same computer 206 as the run-time program 212 and communicating with the run-time program. For example, the external sources could be a computer in a hospital, clinic, laboratory, or doctor's office. The information item is stored in the communication cell as a communication value when it arrives from the external source, asynchronously with the dialog that the run-time program conducts with the user. In one preferred embodiment, the dialog is interrupted and the user is notified of the arrival of the information item by a message which is displayed in a pop-up window. The dialog resumes after the user acknowledges the message. The new communication value influences the resumed dialog by affecting the values of enabling conditions.

Figure 18:
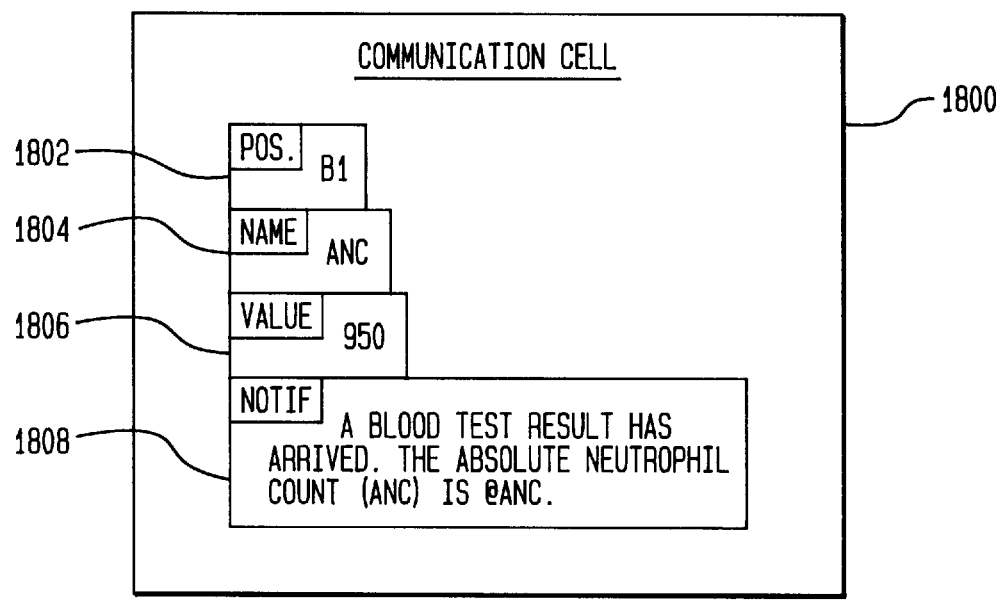
FIG. 18 shows an example of a communication cell.

In one preferred embodiment where an authoring grid is used at authoring time, a communication cell comprises a position field containing the coordinates of the cell, a name field, a value field, and a notification field containing the text of the notification to be presented to the user when a new value is received and stored in the value field of the cell. FIG. 18 shows such a communication cell 1800. The position field 1802, labeled POS, contains the coordinates B1. The name field 1804 contains the name "ANC", the value field 1806 is shown containing the value 950, and the notification field 1808, labeled NOTIF, contains the message: "A blood test result has arrived. The Absolute Neutrophil Count (ANC) is @ANC." In this message, "@ANC" is a paremeter standing for the value of the cell ANC, i.e. the value of the communication cell itself. It is replaced by the current contents of the value field when the notification is presented to the user.

Parameters. such as "@ANC" in the NOTIF field 1808, can be use in other fields containing character strings, such as the TEXT field of a message format or the QUESTION field of a question format.

Figure 19:
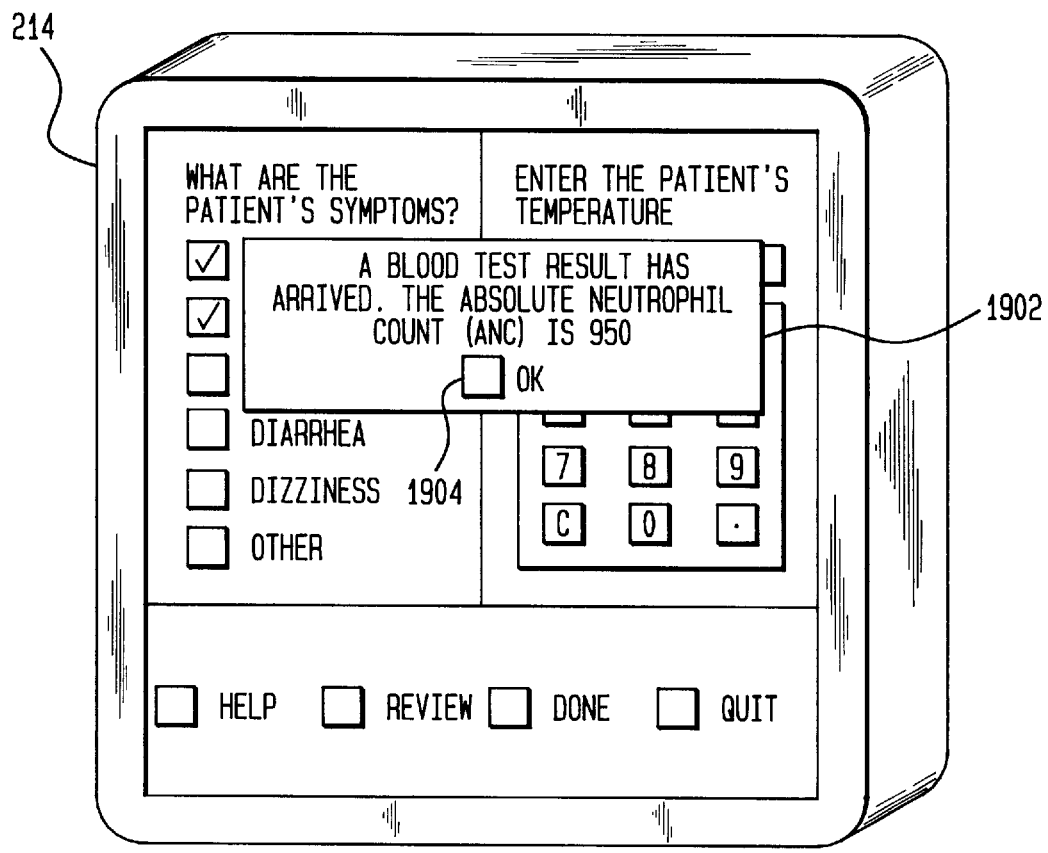
FIG. 19 shows a preferred appearance of the computer display when the user is notified at run time of a change in the value of the communication cell of FIG. 18.

FIG. 19 shows a preferred appearance of the run-time display 214 when a new value of the ANC is received while the interaction shown in the example of FIG. 10 is taking place. The dialog is interrupted by the pop-up window 1902, which notifies the user of the new value. The pop-up window disappears and the dialog resumes when the user presses the OK button 1904.

The communication cell 1800 can be seen on the authoring grid of FIG. 5. The allocated grid cell B1 displays a simulation value of the cell equal to 950, which coincides with the run-time value in the example of FIGS. 18–19, while the name of the cell is displayed on the free grid cell A1 immediately above B1.

Computation cells can be used by the author to define concepts that simplify the specification of complex enabling conditions. At run time, the values of computation cells serve as intermediate results in the evaluation of enabling conditions. Each computation cell contains a formula. By definition, the value of a computation cell is the current value of its formula. An algorithm for evaluating a formula (i.e. for computing its value) is given below.

In one preferred embodiment, the value of a computation cell is computed only if needed for evaluating the enabling conditions. When the value is computed, it is saved in a VALUE field of the computation cell in order to avoid repeated computations of the same value. A special token "–" is stored in the value field to indicate that the current value of the cell is not known and the formula needs to be evaluated. By definition, to clear the value field of a computation cell is to store "–" in the field.

The formula of each computation cell may refer to the values of assertion cells and communication cells, as well as to the values of other computation cells. However there may be no circular chains of references among the computation cells.

In a preferred embodiment, there is no difference between the class of formulas that can be used in computation cells, and the class of formulas that can be used as enabling conditions of interaction cells or assertion cells.

In a preferred embodiment, every formula has a type that can be determined at authoring time. The available types of formulas include logical formulas (a.k.a. boolean formulas), numeric formulas, formulas of type date, formulas of type string, etc. A formula of any type can take the value NIL, referred to as the null value. A logical formula can only take the values TRUE or NIL. A formula of any type other than a logical formula is said to be a data formula. A formula can be:

1. A constant of one of the available types. The value of such a constant is the constant itself.

2. A reference to an assertion or communication cell, which can be the name or the coordinates of the cell. The value of such a formula is the current value of the referenced cell, which is stored in the value field of the cell. The type of such a reference is the type of value that can be stored in the cell. If an assertion cell has more than one links to interaction formats, all the links must specify the same type of values to be obtained from the user and stored in the assertion cell; otherwise an error is detected at authoring time. For example, it would be an error for the assertion cell 1100 of FIG. 11, which receives numeric values through its link to the numeric keypad format 912 of FIG. 9, to also have a link to an answer of a question format, through which it would receive logical values.

3. A reference to a computation cell, which can be the name or the coordinates of the cell. The type of the reference is the type of the formula of the computation cell. The value of the reference is the current value of the computation cell, which can be obtained by evaluating the formula.

4. A data operator formula, comprised of a data operator applied to one or more data operands, which are themselves data formulas (e.g. "Z1+2" where Z1 is a reference to a numeric assertion cell). The types of the operands must be those expected by the operator, otherwise an error is detected at authoring time. If any of the operands takes the value NIL, so does the data operator formula.

5. A relational operator formula, comprised of a relational operator applied to one or more (typically two) data operands which are data formulas (e.g. "Z1>2"). The types of the operands must be those expected by the operator. The relational operator formula is a logical formula, which takes the value NIL if any of the operands takes the value NIL, or if the operands are not in the relationship specified by the operator; otherwise it takes the value TRUE.

6. A logical operator formula, comprised of a logical operator, such as NOT, AND, OR, XOR, etc., applied to one or more operands, which are themselves formulas. The operands may be of any type. By convention, the logical operator treats NIL as falsity and any value other than NIL (not just TRUE) as truth, producing as a result the logical values NIL or TRUE according to its truth-table.

7. A square-brackets formula, which is a formula of any type enclosed in square brackets. The value of a square-brackets formula is 0 if the value of the bracketed formula is NIL, or 1 otherwise. Thus, the square brackets are a type-conversion operator.

While square brackets are used as a type-conversion operator, parentheses can be used for grouping in the usual way.

Note that a constant is a formula according to clause 1 of the above definition. A computation cell may thus have a constant value, given by such a formula.

Figure 20A:
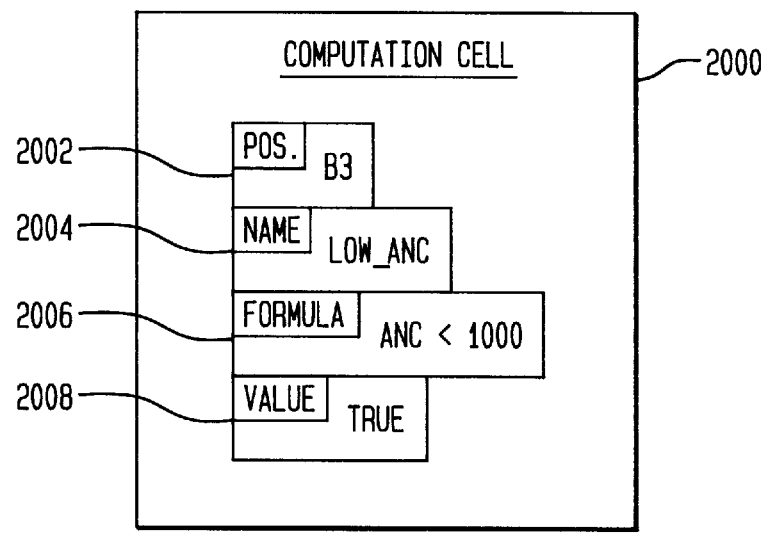
FIG. 20 shows a set of two computation cells (FIGS. 20A and 20B) that define concepts related to the value of the communication cell of FIG. 18.
Figure 20B:
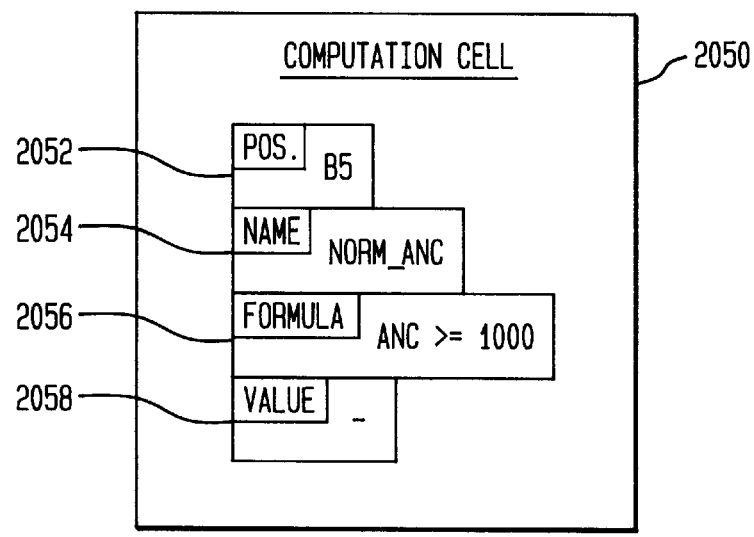
Figure 21A:
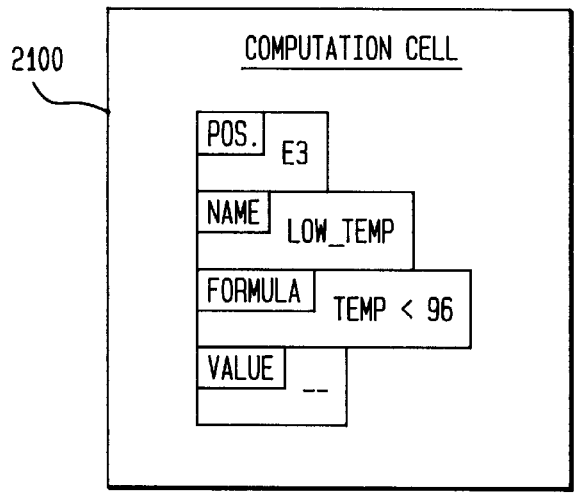
FIG. 21 shows a set of four computation cells (FIGS. 21A, 21B, 21C, and 21D) that define concepts related to the value of the data assertion cell of FIG. 11.
Figure 21B:
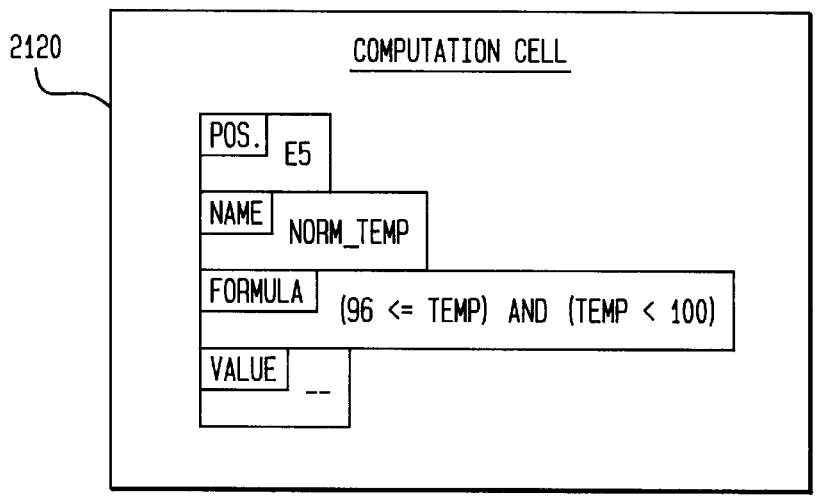
Figure 21C:
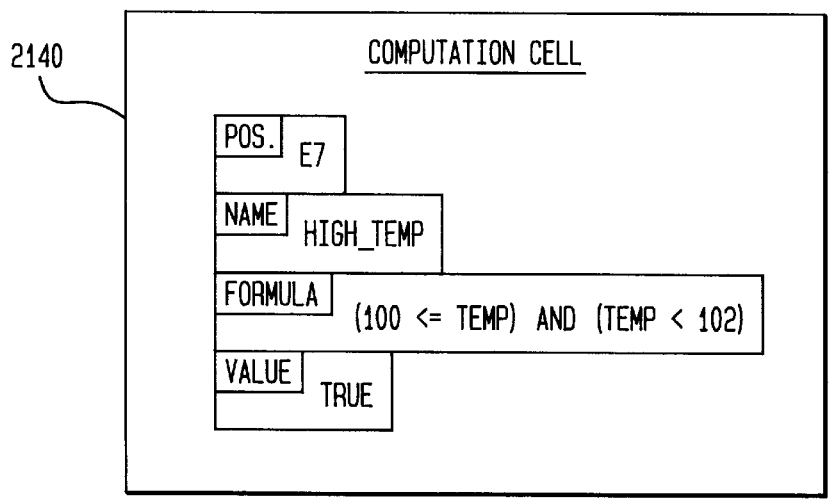
Figure 21D:
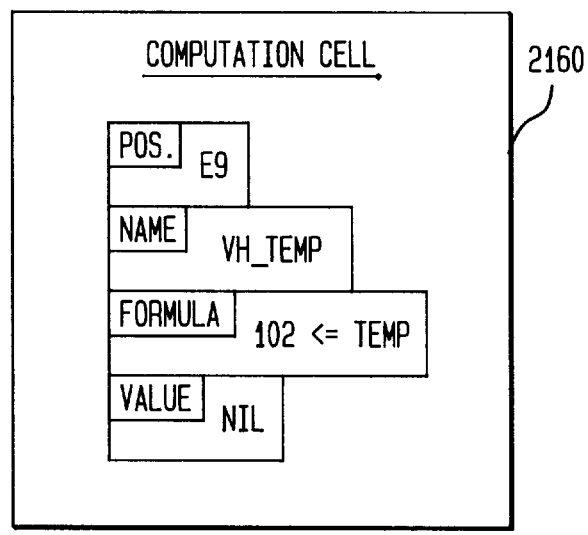

In one preferred embodiment in which an authoring grid is used at authoring time, a computation cell comprises a position field containing the grid coordinates of the cell, a name field, a formula field, and a value field. For example, FIG. 20 shows two computation cells 2000 and 2050 which define two concepts related to the ANC, viz. the low and normal ranges of the ANC respectively. The cell 2000 comprises a position field 2002 containing the coordinates B3, a name field 2004 containing the name LOW_ANC, a formula field 2006 containing the formula "ANC<1000", and a value field 2008 containing the value TRUE. In the formula, ANC is a reference by name to the communication cell 1800; the coordinates B1 of that cell could have been used instead of ANC. The value TRUE is consistent with the value 950 of the communication cell 1800 in the example of FIG. 18.

Similarly, the cell 2050 comprises a position field 2052 containing the coordinates B5, a name field 2054 containing the name NORM_ANC, a formula field 2056 containing the formula "ANC>=1000", and a value field 2058 containing the special token "–" indicating that the current value of the cell is not known and the formula needs to be evaluated.

The computation cells 2000 and 2050 can be seen on the authoring grid of FIG. 5. The name LOW_ANC of the computation cell 2000 is shown in the free grid cell A3 immediately above the grid cell B3 allocated to represented the computation cell. The name NORM_ANC of the computation cell 2050 can be seen in the free grid cells A5–A6 above the allocated grid cell B5. The simulation values of the cells, TRUE and "–", shown in the allocated grid cells, have been chosen to coincide with the contents of value fields in FIG. 20. The formulas of the cells are not shown, but the author can view them by editing the cells as discussed below in connection with FIG. 30.

FIG. 21 shows four computation cells, 2100, 2120, 2140, and 2160 defining four concepts related to the patient's temperature, viz. low, normal, high, and very high temperature respectively. These computation cells can also be found on the authoring grid of FIG. 5.

Figure 22:
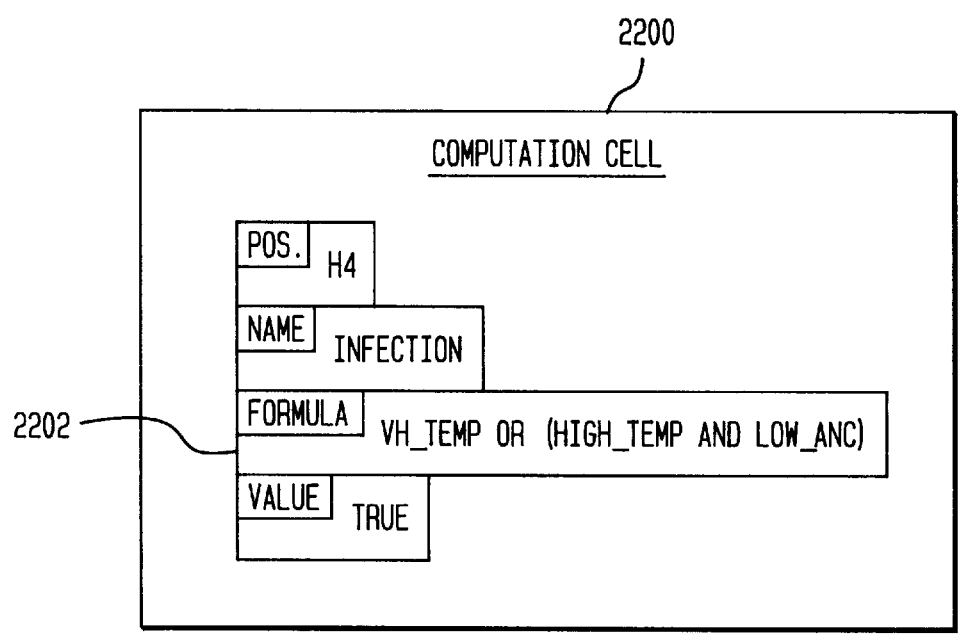
FIG. 22 shows a computation cell that defines a concept useful for specifying the enabling condition of the interaction cell of FIG. 12.

FIG. 22 shows a computation cell 2200 that identifies a danger of infection requiring immediate attention by the doctor who supervises the patient's care. Infection is indicated by temperature higher than normal. When the ANC is low, any infection is dangerous. Hence immediate attention is required if the temperature is very high, or if the temperature is high when the ANC is low. This condition is encoded by the formula shown in the formula field 2202 of the computation cell 2200. Cell 2200 can also be found on the authoring grid, its coordinates being H4.

Recall the interaction cell 1200 of FIG. 12 which, when invoked, instructed the user to call the doctor immediately. The enabling condition 1206 of this interaction cell is the disjunctive formula "H4 OR N8 OR . . . ". When the computation cell H4 takes the value TRUE, this enabling condition takes the value TRUE, and the interaction cell 1200 becomes enabled. Thus the computation cell 2200 defines a concept that simplifies the specification of the enabling condition of the interaction cell 1200. This concept is in turn defined in terms of the concepts introduced by the computation cells 2000, 2140, and 2160. Without these computation cells, the enabling condition of the interaction cell 1200 would be much more complex.

Figure 23:
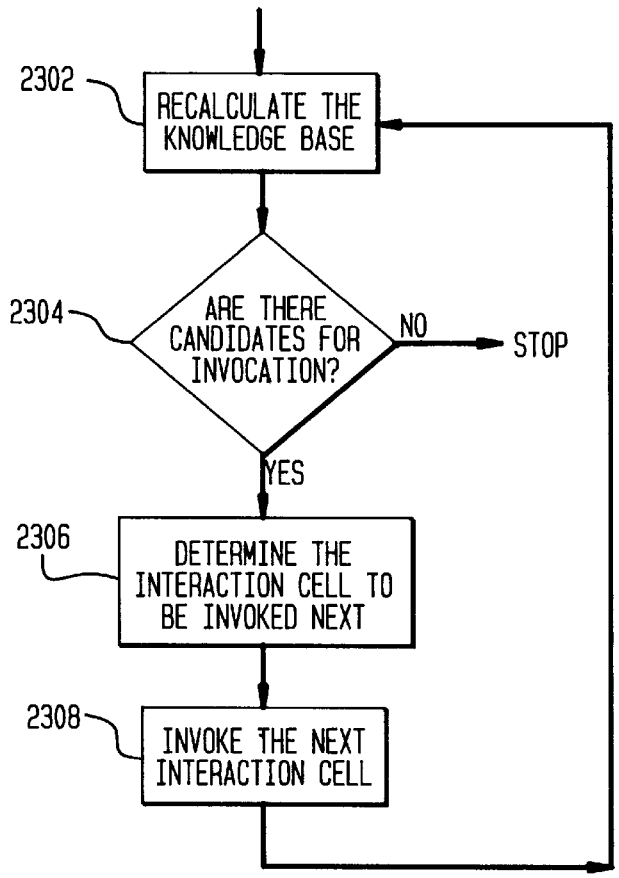
FIG. 23 is a flowchart of the algorithm used by the run-time program to conduct the dialog with the user.

FIG. 23 shows a flowchart of the algorithm used by the run-time program to conduct the dialog with the user at run time.

The first step 2302 is to recalculate the knowledge base. In an embodiment of the invention where assertion cells do not have enabling conditions, to recalculate the knowledge base means to evaluate the enabling conditions of the interaction cells that have not been invoked yet, i.e. the enabling conditions of the interaction cells whose status field contains the keyword READY. These enabling conditions comprise a set of formulas that reference assertion, communication, and computation cells. In one preferred embodiment this set of formulas is evaluated using the algorithm shown in FIG. 24.

The term "knowledge base recalculation" is used by analogy with "spreadsheet recalculation", but the analogy is only a partial one.

Figure 24:
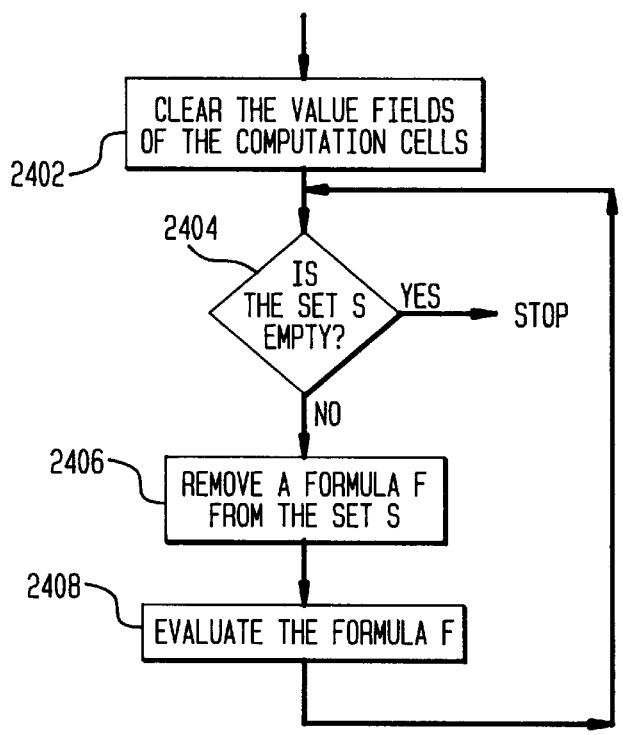
FIG. 24 is a flowchart of a preferred algorithm for evaluating a set of formulas.

FIG. 24 shows a flowchart of a preferred algorithm for evaluating a set S of formulas that reference assertion, communication, and computation cells. In the process of evaluating the formulas in the set S, the formulas of certain computation cells are also evaluated. The first step 2402 is to clear the value fields of the computation cells. The next step 2404 checks whether the set S is empty. If so, the algorithm stops. Otherwise the next step 2406 is to remove from S a formula F; any of the formulas in S can play the role of F. The next step 2406 is to evaluate F using the algorithm of FIG. 25. The process is then repeated from step 2404.

Figure 25:
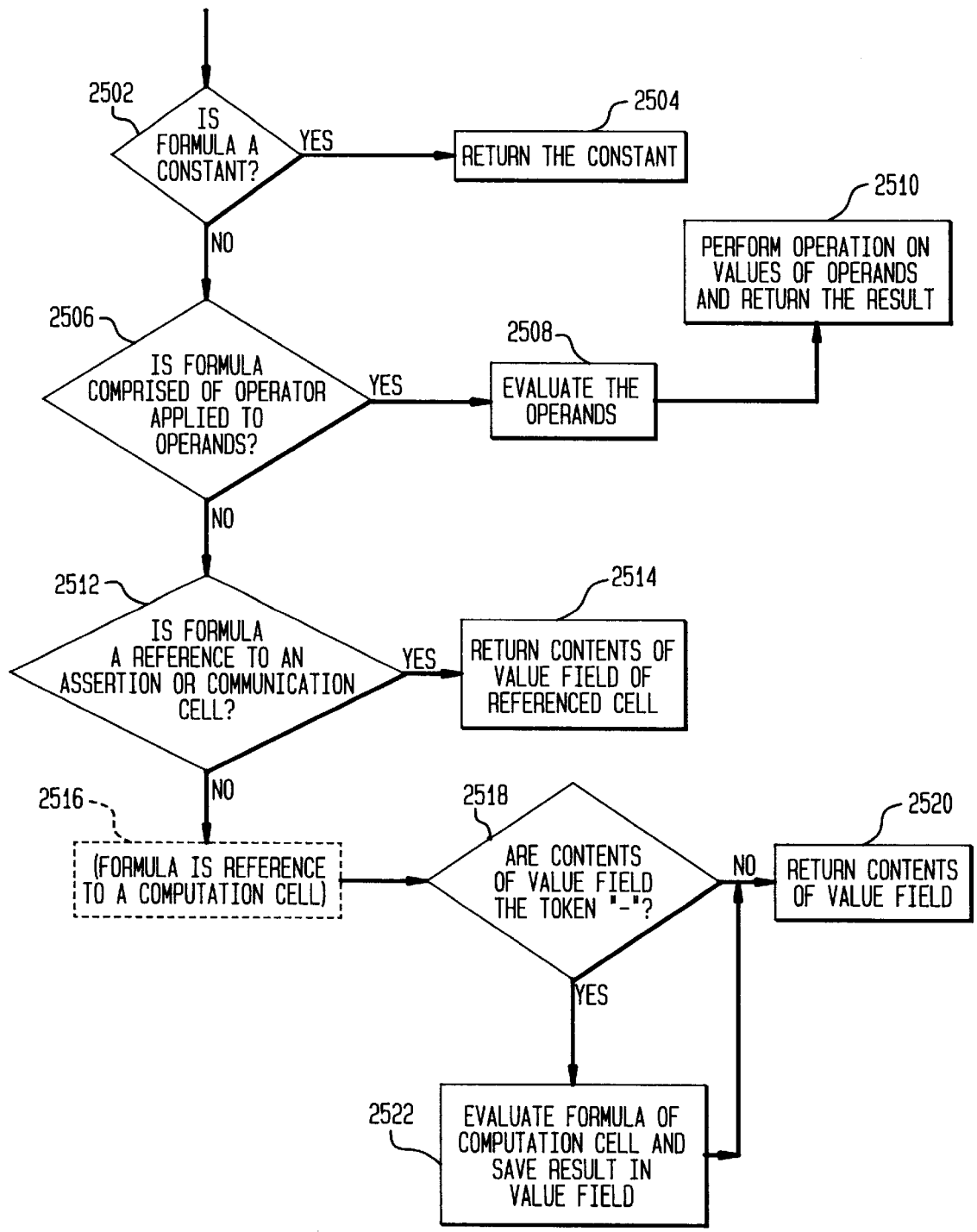
FIG. 25 is a flowchart of a preferred algorithm for evaluating an individual formula.

FIG. 25 shows a flowchart of an algorithm for performing step 2406, i.e. for evaluating a formula F belonging to a set of formulas S that are being evaluated.

The first step 2502 is to check if the formula F is comprised of a single occurrence of a constant C. If so, in step 2504 the constant C is returned as the value of F.

Otherwise the next step 2506 is to check if the formula F is comprised of an operator applied to one ore more operands. Examples of such a formula F are: "G+H", where the operator is + and the operands are two numeric formulas G+H; "G AND H" where the operator is AND and the operands are two formulas G and H of any type; "NOT G" where the operator is NOT and there is only one operand G, which is a formula of any type; and "ff1G"" where the operator is the type conversion operator ff1" and there is one operand G. If F is such a formula, in step 2508 each operand is recursively evaluated by the same algorithm. Then in step 2510 the operation specified by the operator is performed on the values of the operands, and the result is returned as the value of F.

Otherwise, the next step 2512 is to check if the formula F is comprised of one reference to a cell that is an assertion or a communication cell. If so in step 2514 the contents of the value field of the referenced cell are returned as the value of F.

Otherwise, according to the definition of the concept of formula given above, the formula F can only be comprised of one reference to a computation cell. (For clarity, this observation appears in the dashed box 2516, which does not represent a step in the algorithm.) The next step 2518 is then to check if the value field of the referenced computation cell contains the token "–" or some other value. If it contains a value other than "–", in step 2520 this value is returned as the value of the formula F. If it contains "–", in step 2522 the formula of the referenced computation cell is recursively evaluated by the same algorithm, and the result is saved in the value field. Then in step 2520 the value stored in the value field, i.e. the result of the recursive evaluation, is returned as the value of the formula F.

To summarize the algorithm of FIGS. 24 and 25: the formulas in the set S are evaluated in an arbitrary order; when a reference to a computation cell is encountered, the evaluation is interrupted and the formula of the referenced computation cell is recursively evaluated; the result of the recursive evaluation is saved in the value field of the computation cell, so that the formula of the computation cell will not have to be evaluated again when a second reference to the cell is encountered.

The formula of a computation cell may itself reference other computation cells. But the recursion is guaranteed to bottom out because there are no circular chains of references among the computation formulas. Note that certain cells may not need to be evaluated. For example, if a formula F is of the form "G AND H" where the operands G and H are themselves two formulas, and if the value of G turns out to be TRUE (or anything other than NIL), then the value of F is known to be TRUE without evaluating H. The formulas of computation cells referenced only by H are not evaluated.

An alternative method for evaluating a set S of formulas is derived from a method for recalculating a spreadsheet. The formulas of the computation cells and the formulas in the set S are evaluated in sequence, in an order such that no reference to a computation cell is encountered before the formula of the computation cell has been evaluated. It is not necessary to clear the value fields of the computation cells before evaluating the sequence of formulas. As each formula of a computation cell is evaluated, the result of the evaluation overwrites any value that may be stored on the value field of the cell; when a reference to the computation cell is encountered, the new value is already stored in the value field and can be used. An order of evaluation that satisfies the above-stated condition can be found because of the absence of circular chains of references among the computation cells. The formulas in the set S can be placed at the end of the sequence, and the formulas of the computation cells can be placed at the beginning of the sequence in a total ordering compatible with the partial ordering of cell reference among computation cell formulas, i.e. the partial ordering where F precedes F' if and only if F' contains a reference to F. Algorithms for finding a total ordering compatible with a partial ordering are well known. In the field of spreadsheets, a recalculation order compatible with the partial ordering of cell reference is referred to as a "natural order of recalculation".

Another alternative method for evaluating a set S of formulas can be derived by adapting in an obvious way the "METHOD FOR OPTIMAL RECALCULATION" of spreadsheets disclosed in U.S. Pat. No. 5,276,607 (herein incorporated by reference in its entirety), which makes it possible to avoid evaluating certain formulas whose value has not changed since the previous spreadsheet recalculation.

Refer back to FIG. 23. After the recalculation step 2302, the next step 2304 is to check if there are any interaction cells that are candidates for being invoked by the run-time program. An interaction cell is a candidate if it is enabled and ready, i.e. if the value of its enabling condition, computed in step 2302, is other than NIL, and its STATUS field contains the keyword READY. If there are no candidates, the dialog with the user ends. After the dialog has ended, a report can be produced containing the information exchanged during the dialog.

If there are candidates, the next step 2306 is to determine one of them as the interaction cell to be invoked next. In one preferred embodiment, the chosen candidate is one that has become enabled most recently. More specifically, the run-time program keeps a count of the number of recalculations, and tags each interaction cell that has not yet been invoked and is currently enabled with the recalculation number of the earliest recalculation since which the cell has been continuously enabled. (At each new recalculation, newly enabled cells are tagged with the new recalculation number, while previously enabled cells keep their previous tag.) The chosen candidate is one with the newest tag. There maybe two or more candidates with the newest tag. If so, in one preferred embodiment in which a two-dimensional authoring grid is used at authoring time, the tie is broken by considering the position of the candidates on the grid: the chosen candidate is on the row closest to the origin of the grid; if that leaves multiple candidates, the one whose column is closest to the origin is chosen.

In the next step 2308, the chosen candidate is invoked by the run-time program; this causes the interactions specified by the interaction formats of the chosen interaction cell to be carried out, and may cause assertions made by the user to be recorded in some of the assertion cells. In addition the user, is allowed to modify previous answers. As shown in the example of FIG. 7, the control area 706 of the display has a button 710 labeled "Review". Pressing this button allows the user to replay the interactions specified by previously invoked interaction cells. When replayed, those interactions reflect the current values of linked assertion cells, which may be modified as a result of the interactions.

After step 2308, the process is repeated from the beginning.

Refer back to step 2302. In an embodiment where assertion cells may have enabling conditions, to recalculate the knowledge base requires evaluating the enabling conditions of the assertion cells, and forcing to NIL the values of any disabled assertion cells. As above, the term "knowledge base recalculation" is used by analogy with "spreadsheet recalculation", but the analogy is only a partial one.

Figure 26:
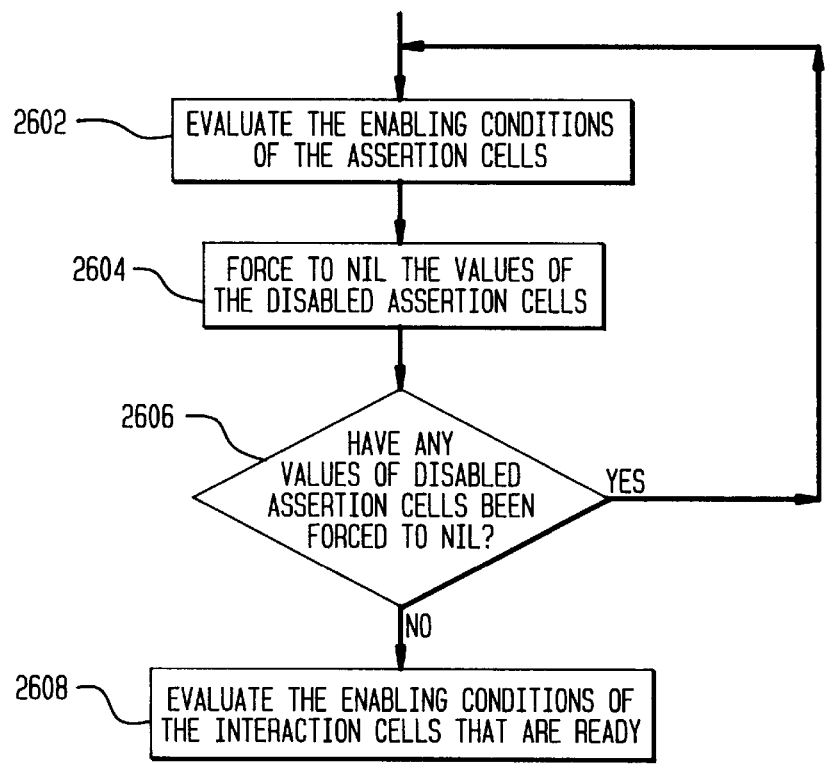
FIG. 26 is a flowchart of an algorithm for recalculating the knowledge base, in the presence of assertion cells having enabling conditions.

FIG. 26 shows a flowchart of an algorithm for recalculating the knowledge base in an embodiment where assertion cells may have enabling conditions.

The first step 2602 is to evaluate the enabling conditions of the assertion cells. These enabling conditions form a set of formulas that reference assertion, communication, and computation cells. In one preferred embodiment, this set of formulas is evaluated using the algorithm of FIG. 24. Alternatively, the methods derived from spreadsheet recalculation methods mentioned above, can be used instead of the algorithm of FIG. 24; note that, since step 2602 may have to be performed multiple times, one "knowledge base recalculation" corresponds to multiple "spreadsheet recalculations" in this case.

The next step 2604 is to force to NIL the values of disabled assertion cells. Recall that a disabled assertion cell is one whose enabling condition, evaluated in step 2602, has the value NIL. If the value field of such a cell contains a value other than NIL, the contents of the value field are changed to NIL.

The next step 2606 is a test. If any values have actually been forced to NIL in step 2604, then steps 2602, 2604 and 2606 are repeated. (Note that there will be a finite number of consecutive repetitions of these three steps, bounded by the initial number of assertion cells having values other than NIL.) Otherwise, the next step 2608 is to evaluate the enabling conditions of the interaction cells that are ready. These enabling conditions comprise a set of formulas that reference assertion, communication, and computation cells. In one preferred embodiment, this set of formulas is evaluated using the algorithm of FIG. 24. Alternatively, the methods derived from spreadsheet recalculation methods mentioned above, can be used instead of the algorithm of FIG. 24.

It has been pointed out above that the authoring system may be as simple as a knowledge base compiler capable of reading a description of the knowledge base written in a formal language. However, it is desirable to provide tools to facilitate the construction of the knowledge base by the author. Two such tools have been mentioned above: an authoring grid, whereby the knowledge base is mapped onto a two-dimensional surface, or onto a three-dimensional collection of two-dimensional surfaces; and a simulation facility, that allows the author to simulate the run-time dialog while the knowledge base is being constructed. The remainder of this detailed description is concerned with a preferred embodiment in which a two-dimensional authoring grid and a simulation facility are made available to the author at authoring time.

In the preferred embodiment described henceforth, assertion cells have optional enabling conditions, and each communication cell has a notification field.

Figure 27:
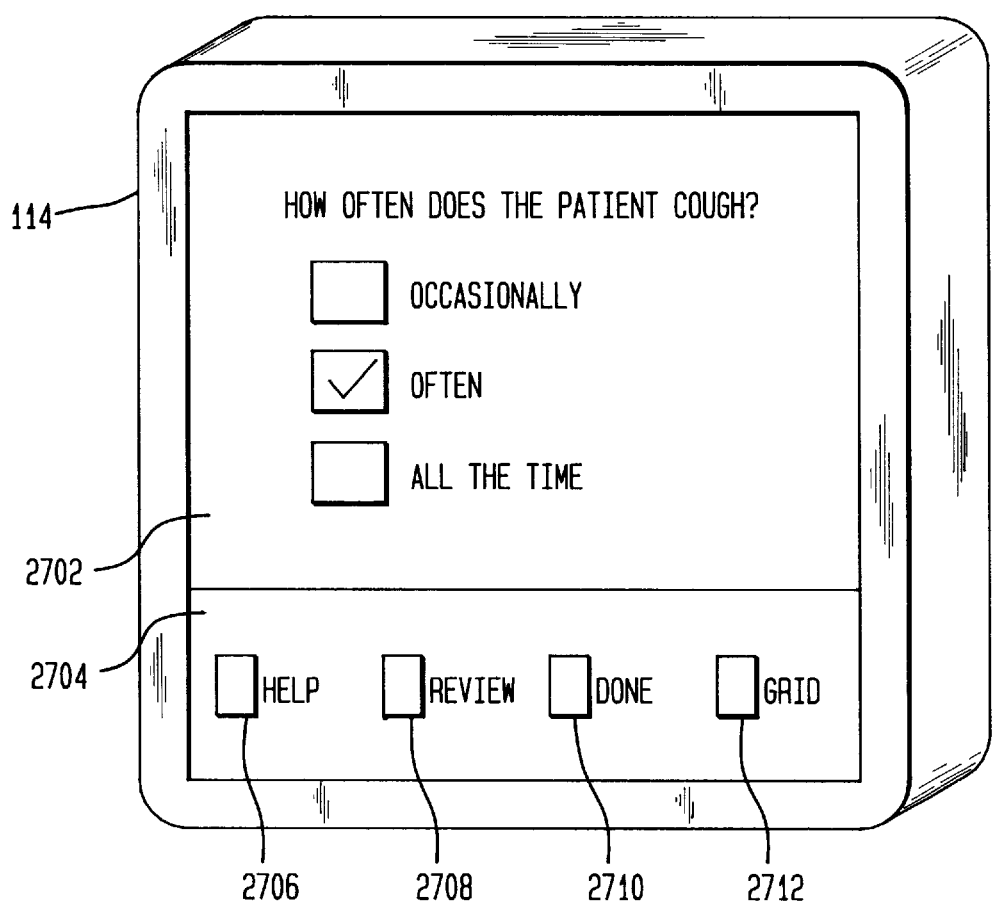
FIG. 27 shows an example of a simulation screen.

In the preferred embodiment, the computer display 114 of the authoring system presents two distinct appearances that will referred to as screens:

1. The simulation screen is used in the course of a simulation. An example of a simulation screen is shown in FIG. 27. The simulation screen is divided into two areas, an interaction area 2702 used for carrying out the interactions specified by an interaction cell, and a control area 2704. In the example of FIG. 27, the interaction area 2702 is displaying the question and menu of answers specified by the question format 610 of the interaction cell 600. The control area 2704 contains a button 2706 labeled "Help", a button 2708 labeled "Review", a button 2710 labeled "Done", and a button 2712 labeled "Grid". Note that the simulation screen is similar to the appearance of the run-time display 214 shown in the examples of FIGS. 7, 10, 13, and 15; the appearance of the run-time display will be referred to as the "run-time screen". In particular, the simulation screen in the example of FIG. 27 is similar to the run-time screen in the example of FIG. 7, the only difference being that the "Quit" button 712 of FIG. 7 is replaced with the "Grid" button 2712 of FIG. 27. In a simulation screen, the "Help" button has two functions: to give help to the author on the use of the authoring system, and to show to the author that help what will be available to the expert system user at run-time under the same circumstances. Alternatively, two different buttons could be provided for these two functions.

Figure 28:
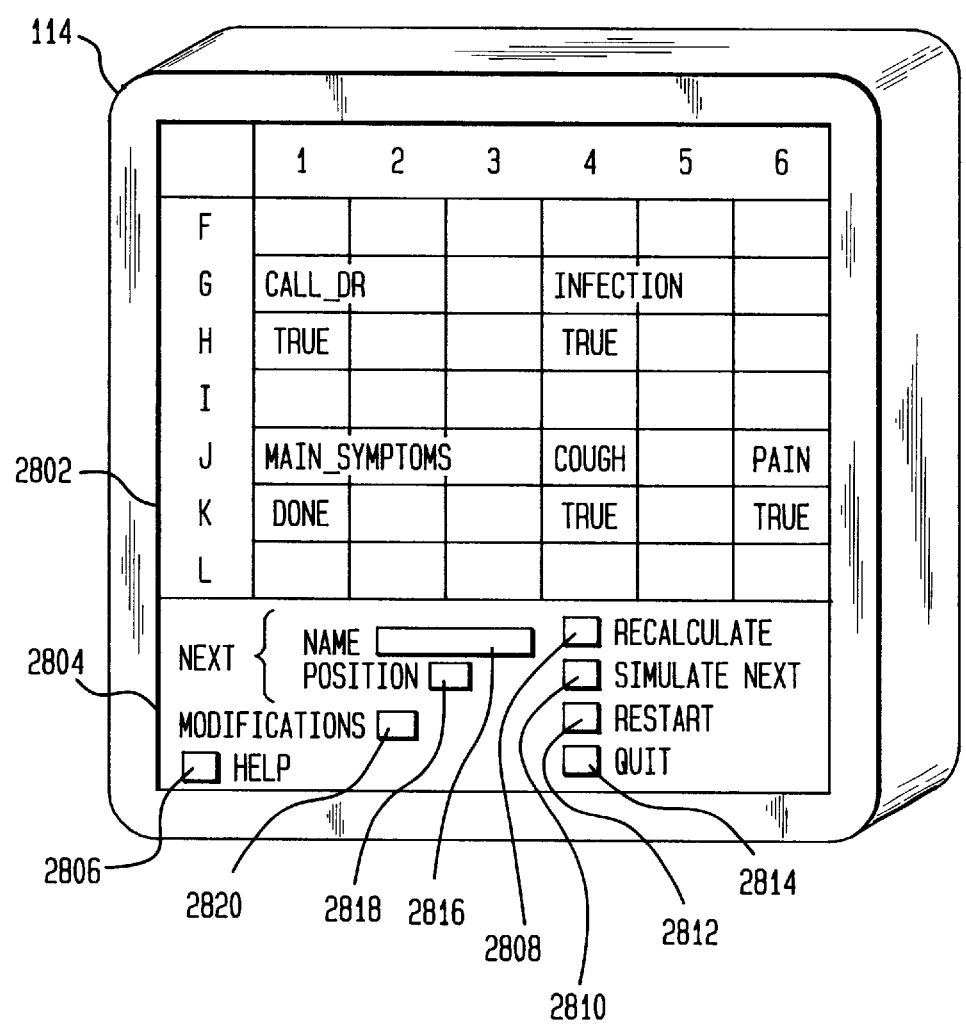
FIG. 28 shows an example of an authoring screen.

2. The authoring screen is used for authoring tasks other than simulation. An example of an authoring screen is shown in FIG. 28. The authoring screen is divided into two areas, a grid area 2802 and a control area 2804. The grid area displays a two-dimensional grid. In the example of FIG. 28 only 8 rows and 6 columns fit in the grid area; the grid has been scrolled up so that rows A through E are not displayed; the contents of the grid are taken from the example of FIG. 5. The control area 2804 contains a "Help" button 2806, a "Recalculate" button 2808, a "Simulate Next" button 2810, a "Restart" button 2812, and a "Quit" button 2814. In an authoring screen, the "Help" button provides help to the author with the use of the authoring system. The control area also contains a "Next" field comprised of two subfields, the "Name" subfield 2816 and the "Position" subfield 2818. The "Next" field 2816–2818 shows the name and coordinates of an interaction cell recorded in a variable of the authoring program called the "Next" register. The "Next" register is used to record, after each knowledge base recalculation, the interaction cell that should be invoked next according to the rules discussed in connection with step 2306 of FIG. 23, the recalculation count mentioned in those rules being kept for the present purposes by the authoring program rather than by the run-time program. The "Next" register is cleared after a recalculation if no interaction cells are candidates for invocation, i.e. if none are enabled and ready. The control area also contains a "Modifications" field 2820, where a check mark is displayed if there have been modifications of the knowledge base since the last recalculation such that the values displayed on the grid or the contents of the "Next" field may not be current. The "Modifications" field 2820 reflects the state ("set" or "cleared") of a variable of the authoring program called the "Modifications" flag. The "Modifications" flag is set by the authoring system after each authoring step that changes a value, changes a formula, or creates a formula; it is cleared after each recalculation.

(In an alternative embodiment, the simulation screen and the authoring screen could be two windows simultaneously present on the computer display 114 of the authoring system, rather than each screen occupying the entire display 114.)

Figure 29:
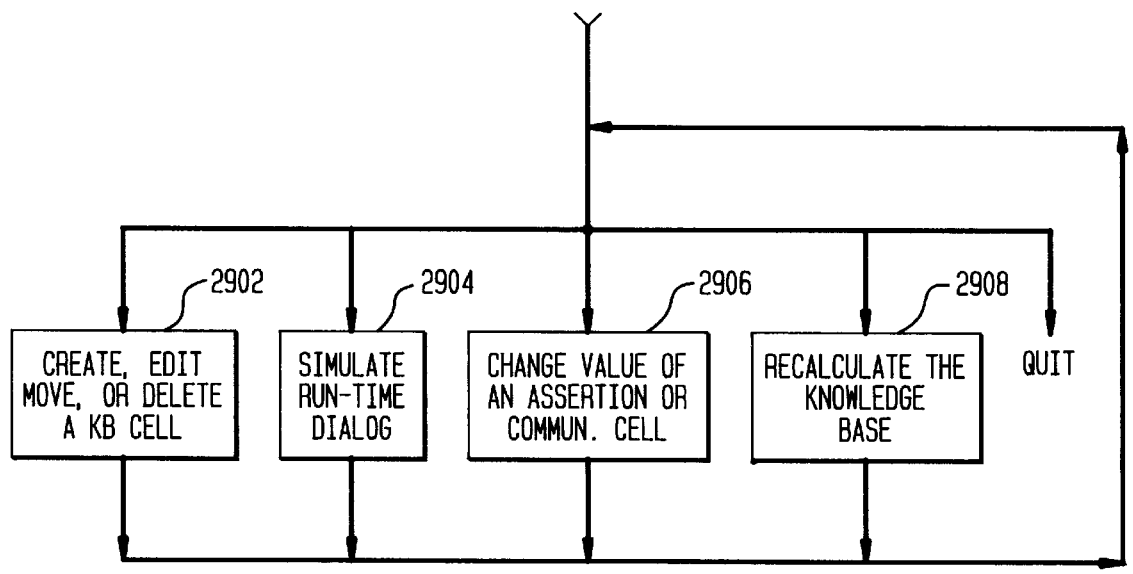
FIG. 29 is a flowchart of a preferred authoring method.

FIG. 29 shows a flowchart of the method for constructing the knowledge base of an expert system (the authoring method) in the preferred embodiment. The process of constructing the knowledge base is interactive, the author choosing the sequence of steps to be carried out. The possibility of a choice by the author is represented by a fork in an arrow of the flowchart. Thus the flowchart of FIG. 29 shows that the author can freely interleave steps of four kinds, represented by boxes 2902, 2904, 2906, and 2908.

Step 2902 is to create, edit, move, or delete a knowledge base cell. The process of creating a knowledge base cell by allocating a grid cell has been discussed already in connection with FIG. 4.

Step 2904 is to simulate a run-time dialog with the expert system user. In a simulation the author plays the role of the user while the authoring system plays the role of the run-time system, conducting the dialog as specified by the current state of the knowledge base under construction.

Step 2906 is to change a value of an assertion or communication cell. At run-time, the value of an assertion cell is only changed as a result of an interaction with the user specified by an interaction cell, and the value of a communication cell is only changed when information is received from an external source. At authoring time, however, the author can change such values at will in order to quickly try out diverse what-if scenarios.

Step 2908 is to recalculate the knowledge base. Recalculation proceeds as at run time, except that, as values change, the changes are seen on the authoring grid.

Figure 30:
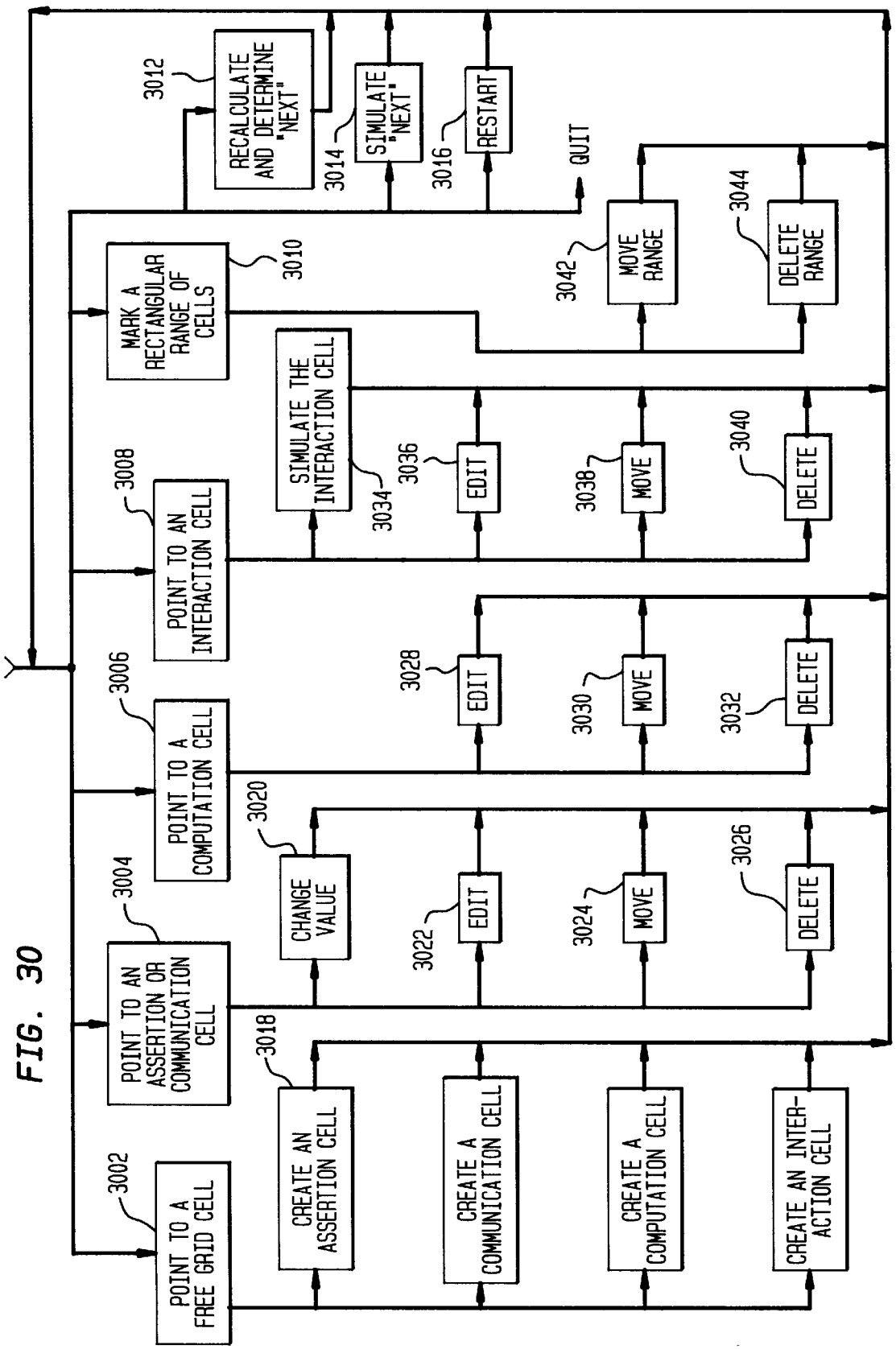
FIG. 30 is a more detailed flowchart of a preferred authoring method.

FIG. 30 is a more detailed flowchart of the authoring method of FIG. 29. It shows how the author performs the authoring steps of FIG. 20 using the commands provided by the authoring and simulation screens. It also shows additional authoring steps that make the authoring task more convenient.

When presented with the authoring screen of FIG. 28, the author can perform one of the steps 3002, 3004, 3006, 3008, 3010, 3012, 3014, or 3016 of FIG. 30, or can quit by pressing the "Quit" button 2814 on the control area of the authoring screen.

The author performs step 3002 by pointing to a free grid cell with the computer mouse 118 and clicking on the left mouse button. As described in connection with FIG. 4, this causes the pop-up menu 408 to be displayed. This menu allows the author to create a knowledge base cell of any kind. For example, the author performs step 3018, "create an assertion cell", by selecting the first item, "ASSERTION", from the menu 408. The authoring system then prompts the user for the name of the assertion cell to be created and for an optional enabling condition, and proceeds to create the assertion cell, which becomes associated with the grid cell, the grid cell being said to have been allocated as an assertion cell.

Figure 31:
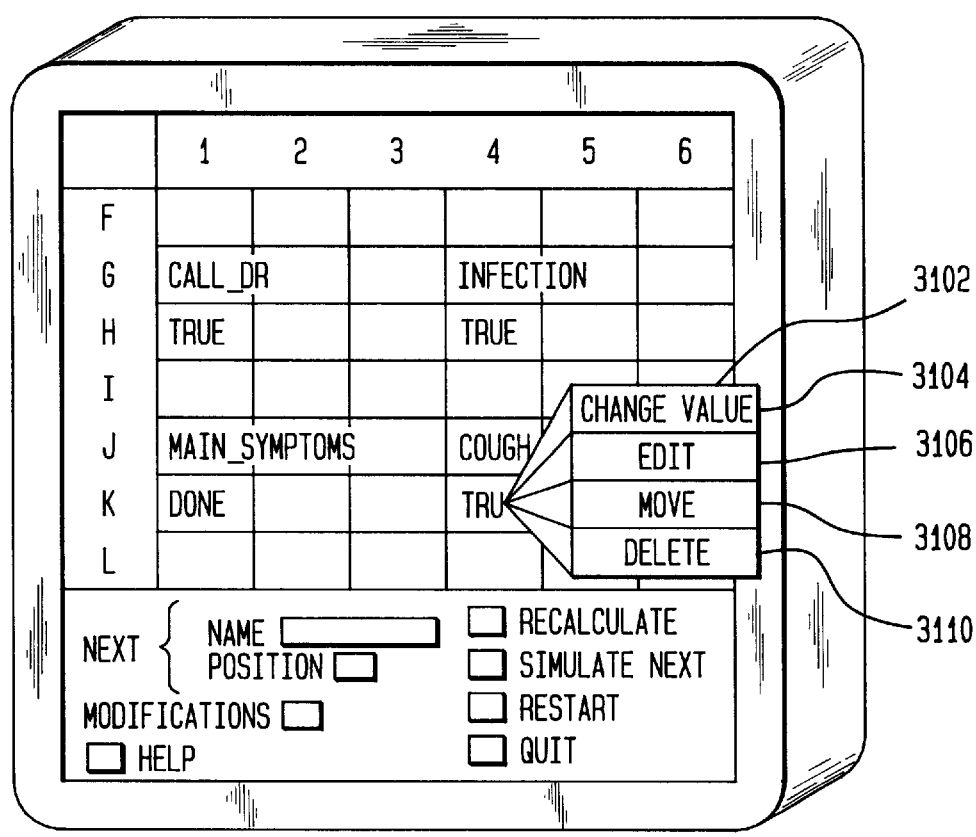
FIG. 31 shows a pop-up menu of actions that the author may perform on an assertion or communication cell.

The author performs step 3004 by pointing with the mouse 118 to a grid cell that has been allocated as a knowledge base that is either an assertion cell or a communication cell, and clicking on the left mouse button. This causes the pop-up menu 3102 shown on FIG. 31 to be displayed. This menu is used by the author to choose the next step to be performed among steps 3020, 3022, 3024, and 3026.

The author performs the "change value" step 3020 by selecting the "change value" item 3104 from the menu. The author is then prompted to supply a new value for the knowledge base cell. The new value replaces the current one in the value field of the knowledge base cell and is displayed in the allocated grid cell.

The author performs the "edit" step 3022 by selecting the "edit" item 3106 from the menu. If the knowledge base cell indicated in step 3004 is an assertion cell that has an enabling condition, the name of the assertion cell and the enabling condition are displayed in a pop-up window and may be edited; the optional enabling condition may be deleted. If the assertion cell does not have an enabling condition, the name of the cell may be edited and an enabling condition may be added. If the knowledge base cell indicated in step 3004 is a communication cell, the name of the communication cell and the message contained in the notification field are displayed and may be edited.

The author performs the "move" step 3024 by selecting the "move" item 3108 from the menu. To move a knowledge base cell means to associate the knowledge base cell with a different grid cell, causing the grid cell currently associated with the knowledge base cell to become a free grid cell (or free cell). The author is prompted for the new grid cell, and can respond to the prompt by pointing to the cell on the grid or typing its coordinates. The authoring program updates any coordinate references to the knowledge base cell by replacing each such reference with the coordinates of the new grid cell.

The author performs the "delete" step 3024 by selecting the "delete" item 3110 from the menu. To delete a knowledge base cell means to delete the cell from the knowledge base and let the grid cell currently associated with the knowledge base cell become a free grid cell.

Figure 32:
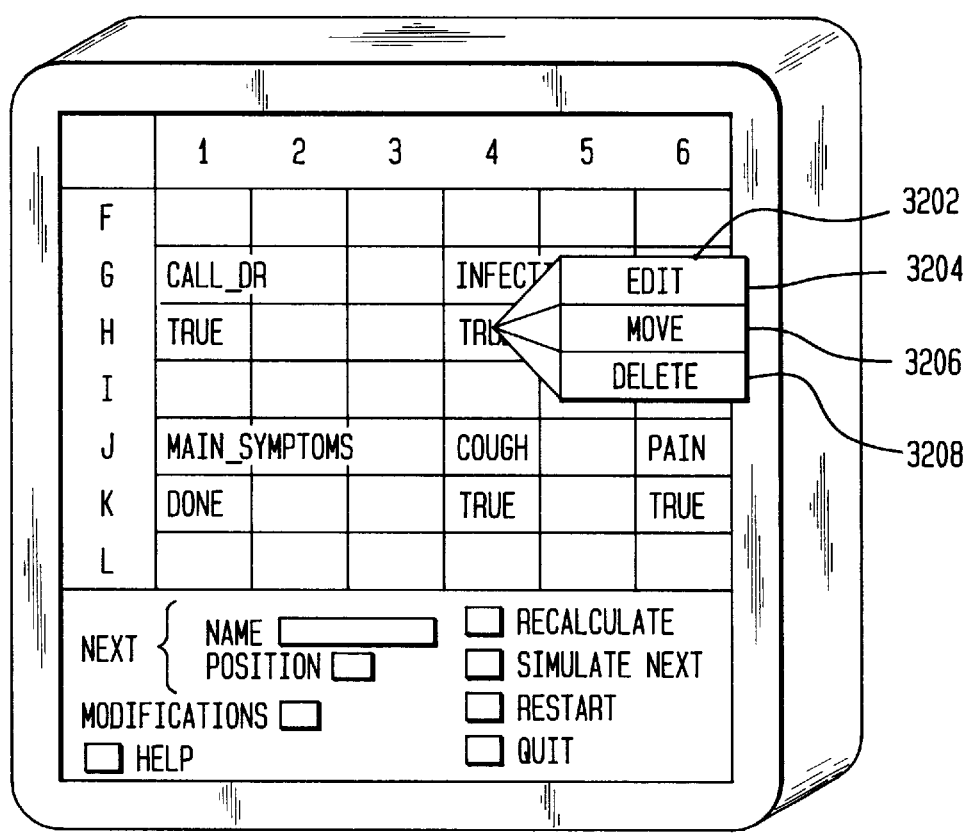
FIG. 32 shows a pop-up menu of actions that the author may perform on a computation cell.

Similarly, the author performs step 3006 by pointing to a grid cell that has been allocated as a computation cell and clicking on the left mouse button. This causes the pop-up menu 3202 shown on FIG. 32 to be displayed. This menu is used by the author to choose the next step to be performed among steps 3028, 3030, and 3032.

The author performs the "edit" step 3028 by selecting the "edit" item 3204 from the menu. The name and formula of the computation cell are then displayed in a pop-up window and can be edited.

The author performs the "move" step 3030 or the "delete" step 3032 by selecting respectively the "move" item 3206 or the "delete" item 3208 from the menu, with the same effects described above for assertion and communication cells.

Note that the menu 3202 does not provide the option of changing the value of the computation cell. In the preferred embodiment, the contents of the value field of a computation field are only changed by the recalculation process or by the "restart" command that will be discussed below.

Figure 33:
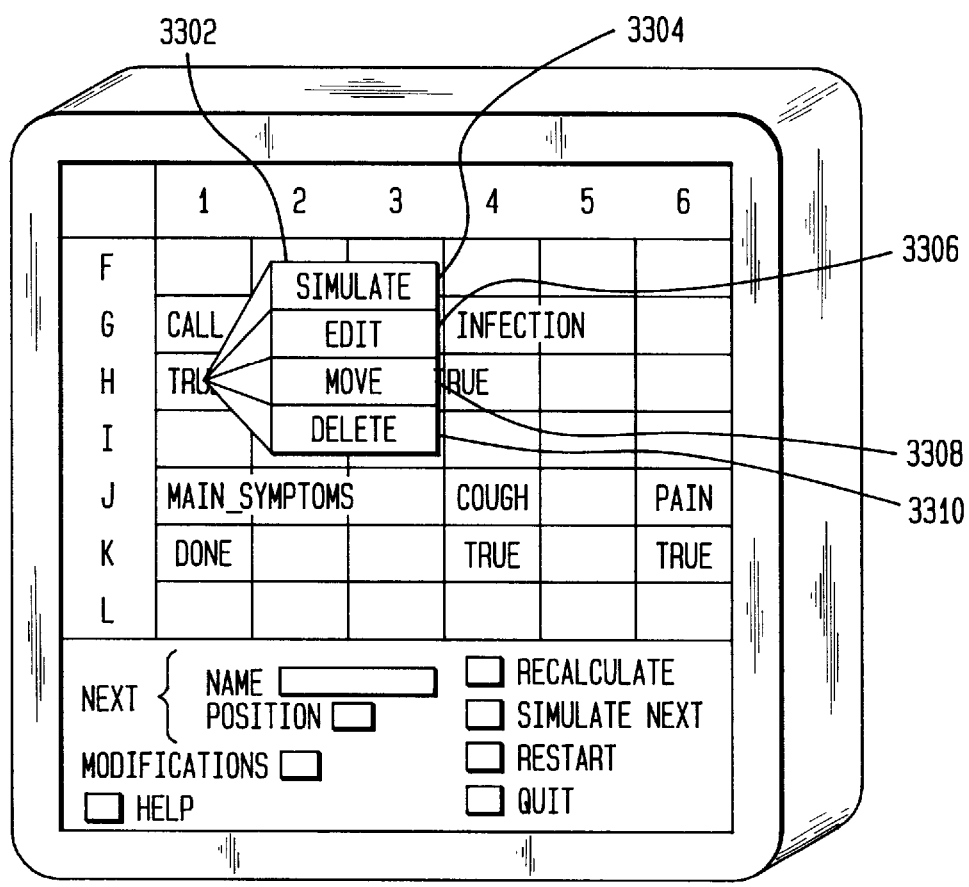
FIG. 33 shows a pop-up menu of actions that the author may perform on an interaction cell.

Continuing with the top of FIG. 30, the author performs step 3008 by pointing to a grid cell that has been allocated as an interaction cell and clicking on the left mouse button. This causes the pop-up menu 3302 shown on FIG. 33 to be displayed. This menu is used by the author to choose the next step to be performed among steps 3034, 3036, 3038, and 3040.

The author performs step 3034 by selecting the "simulate" item from the menu 3302. The authoring program then brings up a simulation screen and begins a simulation by invoking the interaction cell indicated in step 3008. The authoring program uses the algorithm of FIG. 34 to conduct the simulation.

Figure 34:
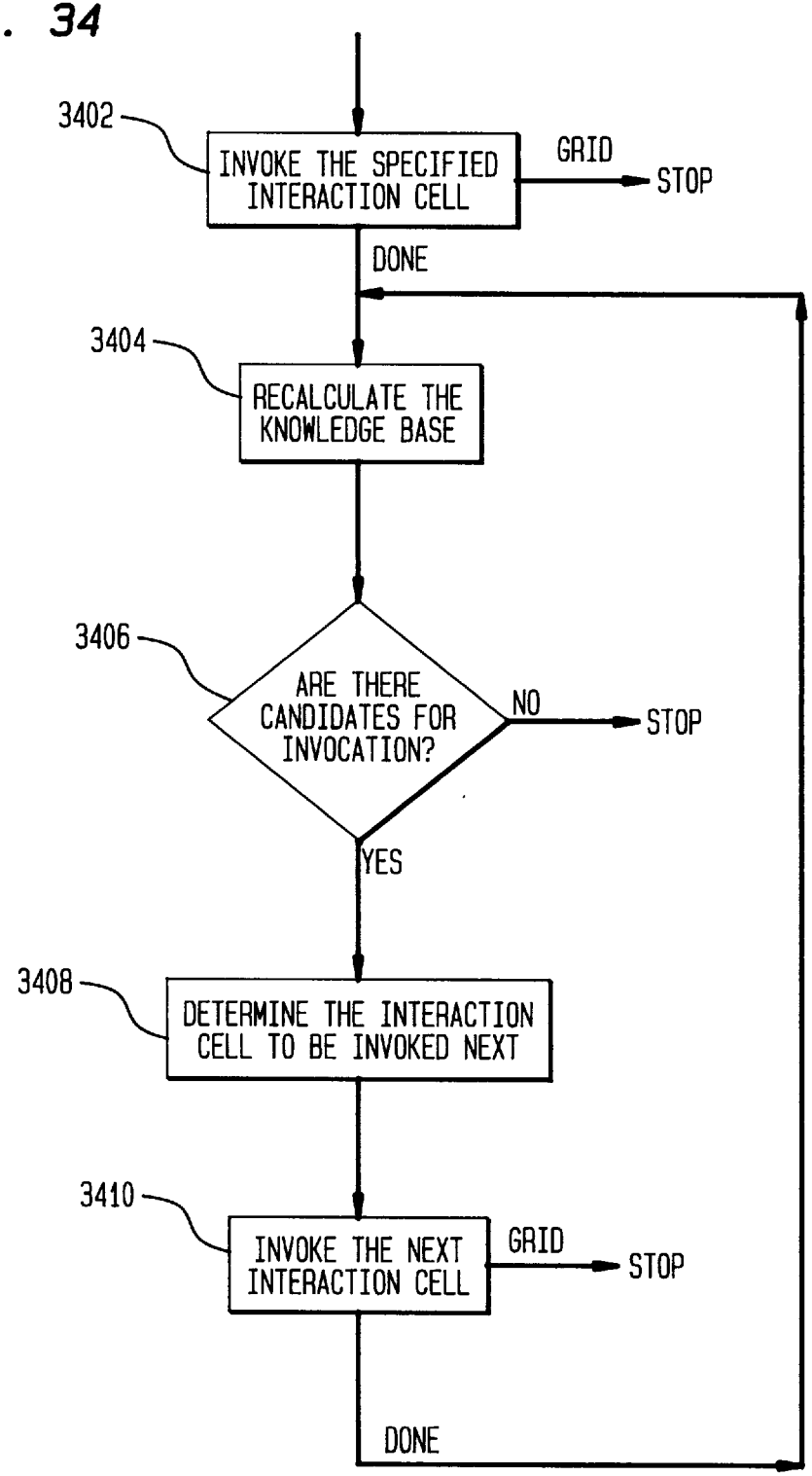
FIG. 34 is a flowchart of a preferred algorithm used by the authoring program to conduct a simulation starting with the invocation of a specified interaction cell.

FIG. 34 is a flowchart of the algorithm used by the authoring program to conduct a simulation starting with the invocation of a specified interaction cell, in the preferred embodiment being described. Notice that this algorithm is similar to the algorithm of FIG. 23 used by the run-time program to conduct the dialog with the user. The algorithm of FIG. 23 will be referred to as the run-time algorithm. (The main difference between the two algorithms is the initial step 3402 in FIG. 34, which is not present in FIG. 23.)

The first step 3402 of the algorithm of FIG. 34 is to invoke the specified interaction cell. The authoring program carries out the interactions specified by the cell as they would be carried out at run time by the run-time program. Any assertions made by the author playing the role of the run-time user are recorded in assertion cells linked to the interaction cell. Step 3402 terminates when the author presses the "Done" button 2710 or the "Grid" button 2712 in the control area of the simulation screen, shown in the example of FIG. 27.

Pressing the "Grid" button 2712 causes the simulation to terminate, and the simulation screen to be replaced with the authoring screen.

If the "Done" button 2710 is pressed, the next step 3404 is to recalculate the knowledge base. The authoring program uses the same recalculation algorithm used by the run time program, shown in FIG. 26. After the recalculation, the "Modifications" flag is cleared.

After the recalculation step, the next step 3406 is to check if there are any interaction cells that are candidates for invocation, an interaction cell being a candidate if it is enabled and ready. If there are no candidates, the "Next" register is cleared, the simulation ends, and the simulation screen is replaced with the authoring screen.

If there are candidates, the next step 3408 is to determine which of them is the interaction cell to be invoked next. This is done as in step 2306 of the run-time algorithm. Once it has been determined, the interaction cell to be invoked next is recorded in the "Next" register.

The next step 3410 is to invoke the next interaction cell determined in step 3408. Step 3410 terminates when the author presses the "Done" button 2710 or the "Grid" button 2712 in the control area of the simulation screen.

Pressing the "Grid" button 2712 causes the simulation to terminate, and the simulation screen to be replaced with the authoring screen.

If the "Done" button 2710 is pressed, the algorithm goes back to step 3404.

While an interaction cell is being invoked in the course of the simulation (in step 3402 or step 3410), the author may review past interactions by pressing the "Review" button 2708 in the control area of the simulation screen.

When the authoring screen is displayed again at the end of the simulation it reflects all changes made to the knowledge base during the simulation. These changes may comprise changes in values of assertion and computation cells, changes in status of interaction cells, as well as changes of the "Next" register and "Modifications" flag.

Refer back to FIG. 30, to continue with the steps that may follows step 3008. The author performs step 3036 by selecting the "edit" item 3306 from the menu 3302. This allows the author to view and edit the name, the enabling-condition formula, and the interaction formats of the interaction cell indicated in step 3008. The author can also toggle the current contents of the status field from READY to DONE or from DONE to READY.

Editing a multimedia interaction format may involve creating new multimedia objects, e.g. recording a new video clip. Alternatively, the multimedia objects used in multimedia interaction formats are created separately, using a multimedia authoring tool, and stored in a multimedia library. Then, changing a multimedia component of an interaction format can be accomplished simply by replacing a reference to an object stored in the multimedia library with a reference to a different object also stored in the multimedia library.

After step 3008, the author performs the "move" step 3038 or the "delete" step 3040 by selecting respectively the "move" item 3308 or the "delete" item 3310 from the menu 3302, with the same effects described above for other kinds of knowledge base cells.

Continuing now with the top of FIG. 30, the author performs step 3010 by marking a rectangular range of cells to be moved or deleted together. The range of cells is marked using the right button of the computer mouse 118. Then pressing the left mouse button brings a pop-up menu from which "move range" or "delete range" can be selected. If "move range" is selected, the author is prompted for the upper left-hand corner of the the position where the rectangular range is to be moved, which can be indicated by pointing to it or typing its coordinates; the cells are then moved and coordinate references are updated, as explained in connection with step 3024 for the move of an individual cell; this accomplishes the "move range" step 3042. If "delete range" is selected, the cells are deleted as explained in connection with step 3026 for the deletion of an individual cell; this accomplishes the "delete range" step 3044.

Moving now to the rightmost column of FIG. 30, the author performs step 3012 by pressing the "Recalculate" button 2808 in the control area of the authoring screen, shown in the example of FIG. 28. This causes the authoring program to recalculate the knowledge base, update the "Next" register and clear the "Modifications" flag.

The authoring program uses the same recalculation algorithm used by the run-time program, shown in FIG. 26, which itself uses the algorithm for evaluating a set of formulas of FIG. 24 and the algorithm for evaluating an individual formula of FIG. 25. A difference with run-time recalculation is, however, that value changes are reflected on the authoring grid as the recalculation progresses. When the values of the computation cells are cleared (as in step 2402 of FIG. 24), the new values "–" of the computation cells are shown on the grid. When formulas of computation cells are evaluated (as in stop 2522 of FIG. 25) and the results are saved in the value fields of the computation cells, the new values are shown on the grid. And as each enabling condition is evaluated (cf. step 2408 of FIG. 24), the new value is shown on the grid; this happens once for each enabling condition of a ready interaction cell, and may happen once or more than once for each enabling condition of an assertion cell.

After the knowledge base has been recalculated, the authoring program updates the "Next" register. If no interaction cells are enabled and ready, the "Next" register is cleared, and so is the "Next" field 2816/2818 in the control area of the authoring screen, shown in the example of FIG. 28. If there are interaction cells that are enabled and ready, then the next one to be invoked is determined by the same rules used in step 2306 of the run-time algorithm of FIG. 23. This cell is recorded in the "Next" register, and its name and coordinates are shown on the "Name" subfield 2816 and "Position" subfield 2818 of the "Next" field.

Finally, the authoring program clears the "Modifications" flag, and removes the check mark if it is present in the "Modifications" field 2820.

Continuing with the rightmost column of FIG. 30, the author performs step 3014 by pressing the "Simulate Next" button 2810 in the control area of the authoring screen, shown in the example of FIG. 28. The authoring program responds to this command by executing the algorithm of FIG. 35.

Figure 35:
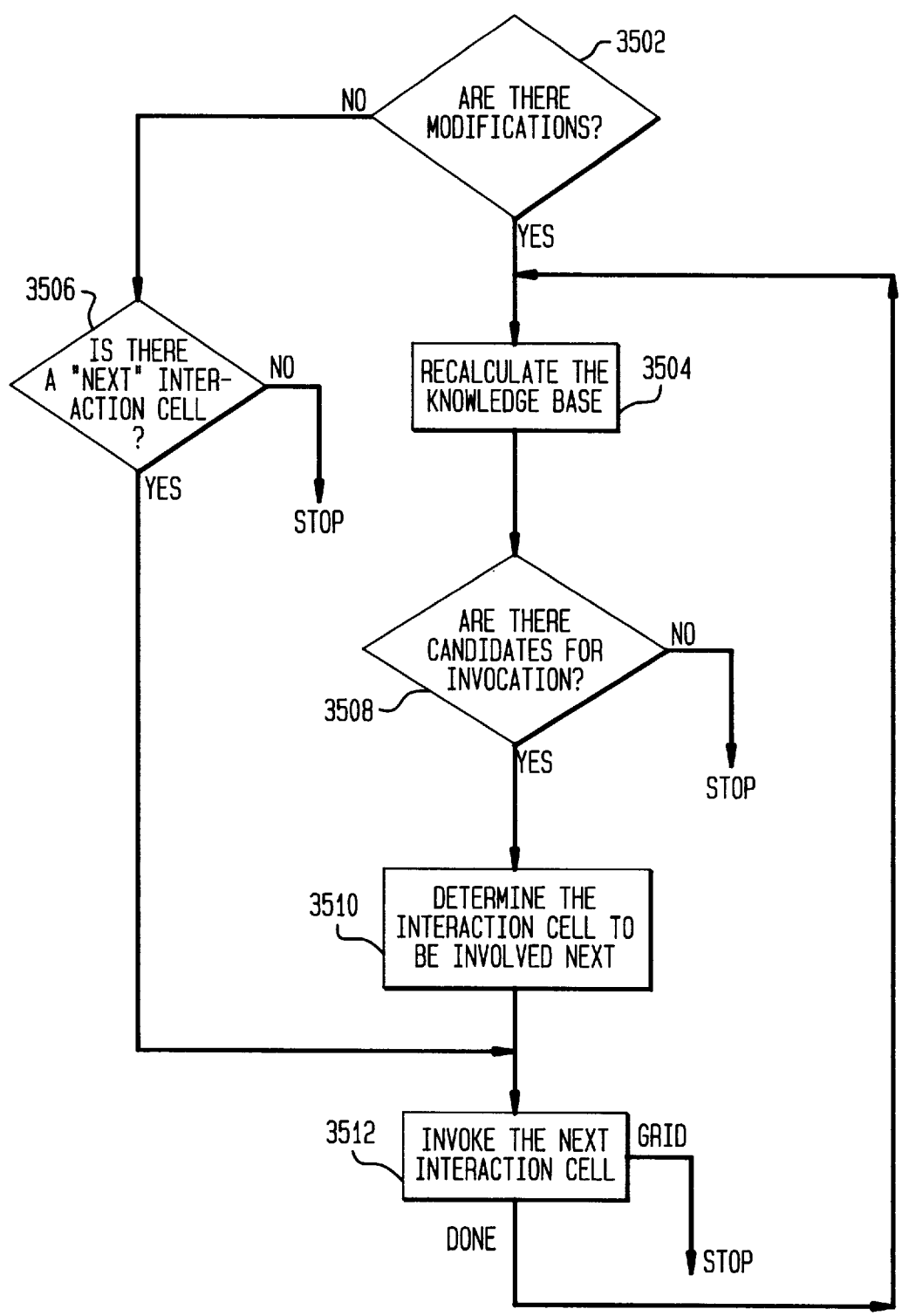
FIG. 35 is a flowchart of a preferred algorithm used by the authoring program to conduct a simulation when no interaction cell is specified as the first one to be invoked.

FIG. 35 is a flowchart of the algorithm used by the authoring program to conduct a simulation when no interaction cell is specified as the first one to be invoked. Like the algorithm of FIG. 34, this algorithm is similar to the run-time algorithm of FIG. 23 used by the run-time program to conduct the dialog with the user.

The first step 3502 is to check if there have been modifications of the knowledge base that may have invalidated the current contents of the "Next" register. This is done by checking the "Modifications" flag. If the flag is currently set, there have been such modifications, and the knowledge base needs to be recalculated.

The next step is then 3504. If the flag is not set, then the "Next" register is current and the next step 3506 is to check its contents. If the register is empty, then no simulation takes place, and a message is displayed in a pop-up window informing the author that no interaction cell is enabled and ready. If the register contains a reference to an interaction cell, then the next step is 3512, described below.

Stop 3504 is to recalculate the knowledge base. As explained in connection with step 3012 of FIG. 30, the authoring program uses the same recalculation algorithm used by the run-time program, with value changes shown on the grid as the recalculation proceeds. After the recalculation, the "Modifications" flag is cleared.

After step 3504, the next step 3508 is to check if there are any candidates for invocation, i.e. if there are any interaction cells currently enabled and ready.

If there are no candidates, no simulation takes place. The "Next" register is cleared and the "Next" field 2816–2818 is cleared to reflect the change in the "Next" register. A message is displayed in a pop-up window informing the author that no interaction cell is enabled and ready.

If there are candidates, the next step 3510 is to determine which of them is the interaction cell to be invoked next. This is done as in step 2306 of the run-time algorithm. Once it has been determined, the interaction cell to be invoked next is recorded in the "Next" register, and the "Next" field 2816–2818 is updated to reflect the new contents of the Next register.

Step 3512, which may follow step 3506 or step 3510, is to invoke the interaction cell recorded in the "Next" register. A simulation screen is displayed for that purpose, replacing the authoring screen. The invocation terminates when the author presses the "Grid" button 2712 or the "Done" button 2710 in the control area of the simulation screen shown in the example of FIG. 27. Pressing the "Grid" button 2712 causes the simulation to terminate, and the display 114 to revert to the authoring screen. If the "Done" button 2710 is pressed, the algorithm goes back to step 3504.

While an interaction cell is being invoked in step 3512, the author may review past interactions by pressing the "Review" button 2708 in the control area of the simulation screen shown in the example of FIG. 27.

When the algorithm goes back to step 3504, the simulation screen is already displayed. This causes steps 3504, 3508, 3510, and 3512 to be performed in a slightly different manner as they are repeated.

During a repeated recalculation step 3504, value changes are not reflected on the grid, since the grid is not in view.

After a repeated step 3508, if there are no candidates for invocation, the simulation terminates and an authoring screen replaces the simulation screen. Contrary to the initial execution of step 3508, no message is displayed in a pop-up window.

In a repeated step 3510, the interaction cell to be invoked next is recorded in the "Next" register, but the "Next" field is not immediately updated since it is not visible.

Finally, in a repeated step 3512, no screen change is needed since the simulation screen is already displayed.

In the algorithm of FIG. 35, if a simulation does take place, when the display 114 reverts to the authoring screen it reflects all changes made to the knowledge base during the simulation. These changes may comprise changes in values of assertion and computation cells, changes in the status of interaction cells, as well as changes of the "Next" register and "Modifications" flag.

Refer back to FIG. 30. Continuing with the rightmost column of the figure, the author performs step 3016 by pressing the "Restart" button 2812 in the control area of the authoring screen, shown in the example of FIG. 28. This has the effect that the values of all the assertion and communication cells become NIL, and the status of all the interaction cells are set to READY. These changes are reflected on the grid. In addition, the recalculation count and the recalculation tags of the interaction cells, used in determining the next interaction cell to be invoked after a recalculation, are set to 0; and the history of past interactions, a list of interaction cells used for the review process, is reduced to the empty list.

When the author presses the Quit button 2814, the authoring process stops. The author can continue the construction of the knowledge base later, or the knowledge base can be shipped to one or more run-time systems in its current state. Typically, the author will press the "Restart" button 2812 before shipping the knowledge base. All assertion cells will then have the value NIL when each run-time system is started, reflecting the fact that no assertions have yet been made by the user. However, the author may choose to ship the knowledge base in a different state where some assertion cells have values other than NIL.

One skilled in the art given this disclosure could develop other equivalent embodiments of the present invention that are also within the contemplation of the inventor.

We claim:

1. A system for authoring an expert system, comprising:
   a computer with a storage system for storing data and programs;
   a computer display for displaying one or more grids containing a plurality of grid cells; and
   an interactive authoring program running on the computer at an authoring time that allows an author to allocate one or more grid cells as a knowledge base cell, the knowledge base cells comprising assertion cells and interaction cells, each assertion cell recording an assertion value that may be updated by an expert system user at a run time, each interaction cell having one or more interaction formats, each interaction format specifying an interaction to be conducted with the expert system user when the interaction cell is invoked at the run time, and each interaction format also specifying one assertion cell for each assertion that the expert system user can make when the interaction cell is invoked at the run time, each interaction cell also having an enabling condition provided by the author to enable the invocation of the interaction cell at the run time, and each enabling condition being a formula that contains zero or more references to assertion cells, each interaction cell also having a tag for storing a recalculation number during the run time that identifies a time since which the interaction cell has been continuously enabled at the run time, the tag being used at the run time to identify a most recently enabled interaction cell, the most recently enabled interaction cell being invoked ahead of other enabled interaction cell at the run time,
   whereby the set of knowledge base cells allocated by the author at the authoring time comprise the knowledge base of the expert system.

2. An authoring system, as in claim 1, that allows the author to allocate one or more of the interaction cells with interaction formats being question formats, a question format specifying a question to be posed to the expert system user at the run time and a menu of answers from which the expert system user may make zero or more selections at the run time, each selection being an assertion to be recorded by storing a true logical value in an assertion cell specified by the question format.

3. A system, as in claim 1, that allows the author to allocate one or more of the interaction cells with message formats, a message format specifying information to be presented to the expert system user at the run time.

4. A system, as in claim 1, where the computer is a multimedia computer and the system allows the author to allocate one or more of the interaction cells with multimedia formats.

5. A system as in claim 1, where the system allows the author to allocate knowledge base cells that further comprise communication cells for storing an information item obtained by the expert system from an external source at the run time, and each enabling condition of an interaction cell being a formula that further contains zero or more references to communication cells.

6. A system, as in claim 5, where each communication cell that the author allocates specifies a message by which the expert system user is notified at the run time when an information item is received from an external source and stored in the communication cell.

7. A system, as in claim 1, where, at the authoring time, each assertion cell has a simulation value, the simulation value being shown on the grid cell allocated as the assertion cell, and the author being allowed to update the simulation value.

8. A system, as in claim 7, where the authoring program further allows the author to simulate at the authoring time a run-time dialog between the expert system and the expert system user, the author playing the role of the expert system user while the authoring system plays the role of the expert system, each assertion cell having, at the start of the simulation, the simulation value shown on the grid cell allocated as the assertion cell.

9. A system, as in claim 1, where the kinds of knowledge base cells that the system allows the author to allocate further comprise computation cells, each computation cell having a computation formula that contains zero or more references to assertion cells and computation cells, each enabling condition of an interaction cell being a formula that further contains zero or more references to computation cells.

10. A system, as in claim 9, where, at the authoring time, each assertion cell has a simulation value, which is shown on the grid cell allocated as the assertion cell, and where the authoring program further allows the author to update the simulation values of one or more assertion cells.

11. A system, as in claim 10, where the authoring program recalculates the knowledge base the update of one or more of the simulation values, the recalculation resulting in updated values of computation cells and updated values of enabling conditions of interaction cells, the updated values being shown on the grid.

12. A system, as in claim 1, where the authoring program further allows the author to edit a knowledge base cell.

13. A system, as in claim 1, where the authoring program further allows the author to move a knowledge base cell from an original grid position to a new grid position, causing the grid cell in the new grid position to be allocated as the knowledge base cell, and the grid cell in the original grid position to become a free grid cell, the authoring program automatically replacing all references to the original grid position in the knowledge base with references to the new grid position.

14. A system, as in claim 1, where the authoring program further allows the author to delete a knowledge base cell, causing the grid cell allocated as the knowledge base cell to become a free grid cell.

* * * * *